US 6,747,971 B1

(12) United States Patent
Hughes et al.

(10) Patent No.: US 6,747,971 B1
(45) Date of Patent: Jun. 8, 2004

(54) CROSSPOINT SWITCH WITH INDEPENDENT SCHEDULERS

(75) Inventors: David A. Hughes, Mountain View, CA (US); Daryn Lau, Saratoga, CA (US); Dan Klausmeier, Menlo Park, CA (US); Eugene Wang, Fremont, CA (US); Madhav Marathe, Cupertino, CA (US); Frank Chui, Sunnyvale, CA (US); Gene K. Chui, Campbell, CA (US); Gary Kipnis, Sunnyvale, CA (US); Gurmohan S. Samrao, San Jose, CA (US); Lionel A. King, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/295,429

(22) Filed: Apr. 20, 1999

(51) Int. Cl.[7] .............................................. H04L 12/56
(52) U.S. Cl. ..................................... 370/387; 370/395.1
(58) Field of Search .............................. 370/389, 395.1, 370/390, 387

(56) References Cited

U.S. PATENT DOCUMENTS

| 5,130,984 A |   | 7/1992  | Cisneros |  |
|---|---|---|---|---|
| 5,157,654 A |   | 10/1992 | Cisneros |  |
| 5,274,631 A |   | 12/1993 | Bhardwaj |  |
| 5,367,520 A | * | 11/1994 | Cordell |  |
| 5,577,035 A |   | 11/1996 | Hayter et al. |  |
| 5,717,871 A |   | 2/1998  | Hsieh et al. |  |
| 5,768,257 A | * | 6/1998  | Khacherian et al. | 370/229 |
| 5,790,545 A |   | 8/1998  | Holt et al. |  |
| 5,832,303 A |   | 11/1998 | Murase et al. |  |
| 5,896,380 A | * | 4/1999  | Brown et al. | 370/388 |
| 5,898,687 A | * | 4/1999  | Harriman et al. | 370/390 |
| 6,044,061 A | * | 3/2000  | Aybay et al. | 370/230 |
| 6,069,893 A | * | 5/2000  | Parruck et al. | 370/395 |
| 6,072,772 A | * | 6/2000  | Charny et al. | 370/229 |
| 6,147,969 A | * | 11/2000 | Benmohamed et al. | 370/230 |
| 6,185,188 B1 | * | 2/2001  | Hasegawa | 370/235 |
| 6,343,066 B2 | * | 1/2002  | Magill et al. | 370/230 |
| 6,515,991 B1 | * | 2/2003  | McKeown | 370/390 |
| 6,577,635 B2 | * | 6/2003  | Narayana et al. | 370/395.42 |
| 6,633,568 B1 | * | 10/2003 | Han et al. | 370/395.4 |
| 6,661,788 B2 | * | 12/2003 | Angle et al. | 370/390 |

FOREIGN PATENT DOCUMENTS

| WO | WO98/44686  | 10/1998 |
| WO | WO 98/44686 | 10/1998 |

OTHER PUBLICATIONS

PCT Search Report, PCT/US 00/10675.
Nick McKeown, The iSLIPScheduling Algorithm for Input–Queued Switches, IEEE/ACM Transactions on Networking, Vol 7, No. 2, Apr. 1999.

(List continued on next page.)

Primary Examiner—Kenneth Vanderpuye
(74) Attorney, Agent, or Firm—Blakely, Sokoloff, Taylor & Zafman LLP

(57) ABSTRACT

An apparatus is described comprising an ingress port and a plurality of switch planes where each of the switch planes has a dedicated scheduler and each of the switch planes are communicatively coupled to the ingress port. The switch planes may further have at least one input control port and at least one output control port where each of the input control ports are coupled to each of the output control ports in a crossbar arrangement. The communicative coupling may further comprise one of the input control ports coupled to the ingress port. Furthermore, the ingress port may have at least one unicast queue which is dedicated to a specific egress port. The ingress port may also have a multicast queue. The dedicated scheduler may further comprise a pointer to determine priority between multicast and unicast traffic, a pointer to determine priority between contending input control ports having multicast traffic and/or a pointer for each of the output control ports to determine priority between contending input control ports having unicast traffic. The apparatus may also further comprise a plurality of ingress ports where each of the ingress ports are communicatively coupled to one of each of the input control ports.

138 Claims, 12 Drawing Sheets

OTHER PUBLICATIONS

Arturo Cisneros, Large Packet Switch and Contention Resolution Device; International Switching Sumposium 1990, Stockholm Sweden May 28–Jun. 1, 1990.

Joan Garcia–Haro and Andrzej Jajszczyk, "ATM Shared–Memory Switching Architecture" IEEE Network, vol. 8 No. 3, Jul./Aug. 1994, pp. 18–26.

Michael G. Hluchyj and Mark J. Karol, "Queing in High–Performance Packet Switching," IEEE Journal on Selected Areas in Communications, vol. 6, No. 9. Dec. 1988. pp. 1587–1597.

Soung C. Liew and Kevin W. Lu, "Comparison of Buffering Strategies for Asymmetric Packet Switch Modules," IEEE Journal on Selected Areas in Communications, vol. 9, No. 3, Apr. 1991, pp. 428–438.

Kai Y. Eng, Mark J. Karol, and Yu–Shuan Yeh, "A Growable Packet (ATM) Switch Architecture: Design Principles and Applications," IEEE Transactions on Communications, vol. 40, No. 3, Feb. 1992, pp. 423–430.

Mark J. Karol and Chih–Lin I, "Performance Analysis of a Growable Architecture for Broad–Band Packet (ATM) Switching," IEEE Transactions on Communications, vol. 40, No. 3, Feb. 1992, pp. 431–439.

Patent Cooperation Treaty's Written Opinion for International application No. PCT/US00/10675, dated Mar. 27, 2001, 6 pgs.

Nick McKeown, "The iSLIP Scheduling Algorithm For Input–Queued Switches", IEEE/ACM Transactions On Networking, vol. 7, No. 2, Apr. 1999, pp. 188–201.

Arturo Cisneros, "Large Packet Switch and Contention Resolution Device", International Switching Symposium (ISS), Poster Session, Paper #14, May/Jun. 1990, Proceedings, vol. III, pp 77–83.

Joan Garcia–Haro and Andrzej Jajszczyk, "ATM Shared–Memory Switching Architectures", IEEE Network, May/Jun. 1994, vol. 8, No. 3, pp 18–26.

Michael G. Hluchyj and Mark J. Karol, "Queueing in High–Performance Packet Switching", IEEE Journal On Selected Areas In Communications, vol. 6, No. 9, Dec. 1988, pp. 1587–1597.

Soung C. Liew, and Kevin W. Lu, "Comparison of Buffering Strategies For Asymmetric Packet Switch Modules", IEEE Journal On Selected Areas In Communication, vol. 9, No. 3, Apr. 1991, pp. 428–438.

Kai Y. Eng and Mark J. Karol and Yu–Shuan Yeh, "A Growable Packet (ATM) Architecture: Design Principles and Applications", IEEE Transactions On Communications, vol. 40, No. 2, Feb. 1992, pp. 423–430.

Mark J. Karol and Chih–Lin I, " Performance Analysis Of A Growable Architecture For Broad–Band Packet (ATM) Switching", IEEE Transactions On Communications, vol. 40, No. 2, Feb. 1992, pp. 431–439.

* cited by examiner

| SFrame Request | Priority |
|---|---|
| Multicast Primary w/ speed up | Multicast High Priority |
| Unicast Primary w/ speed up | Unicast High Priority |
| Multicast Primary w/o speed up | Multicast Cell Available |
| Unicast Primary w/o speed up | Unicast Cell Available |
| Unicast Secondary | Unicast Low Priority |

FIG. 10A

MULTICAST PREFERRED MODE
RANKING SCHEME 1002

1. MULTICAST HIGH PRIORITY
2. UNICAST HIGH PRIORITY
3. MULTICAST CELL AVAILABLE
4. UNICAST CELL AVAILABLE
5. UNICAST LOW PRIORITY

UNICAST PREFERRED MODE
RANKING SCHEME 1003

1. UNICAST HIGH PRIORITY
2. MULTICAST HIGH PRIORITY
3. UNICAST CELL AVAILABLE
4. MULTICAST CELL AVAILABLE
5. UNICAST LOW PRIORITY

CROSSPOINT SWITCH WITH INDEPENDENT SCHEDULERS

FIELD OF INVENTION

The field of the invention relates to networking in general and switching system architecture more specifically.

BACKGROUND OF THE INVENTION

Networking switches are used to quickly transport traffic across different connections at a network node. FIG. 1 shows an architectural perspective of a typical networking switch. Incoming traffic (from inbound physical lines 102a–x) enters the switch at various adapter cards 103a–y and is subsequently processed by ingress ports 104a–z. The traffic is then directed from the ingress ports 104a–z to the switching fabric 105. The switching fabric 105 then directs the traffic to the appropriate egress ports 106a–z from whence its ultimately sent to adapter cards 103a–y and outbound physical lines 107a–x. A single adapter card typically has both inbound and outbound physical lines 102, 107 thus the same adapter card (e.g., adapter card 103a) is shown in FIG. 1 on the ingress and egress sides of the switching fabric 105.

There are typically six basic levels of a switch: inbound physical lines 102, adapter cards 103, ingress ports 104, the switch fabric 105, egress ports 106, and outbound physical lines 107. Ingress ports send network traffic to the switching fabric while egress ports are logic levels that collect network traffic from the switching fabric. Sometimes the ports are located on the adapter cards while in other instances the ports are located on separate logic cards that logically fit between the adapter cards and the switch core.

It is important to note that the number of physical lines (x) does not necessarily equal the number of adapter cards (y) or the number of ingress/egress ports (z). For example, one adapter card may support more than one physical line (e.g., adapter card 103a may support physical lines 102a–c and 107a–c). Furthermore, the number of adapter cards (y) does not necessarily equal the number of ports (z). For example, port 104a may aggregate traffic from adapter cards 103a–b. Thus, the switch architecture may aggregate traffic flow at different levels within the switch.

Regardless of the switch design, however, usually all switch architectures may be reduced to the generic design 200 shown in FIG. 2. FIG. 2 shows ingress ports 204a–n with incoming traffic 201a–n, egress ports 206a–n with outgoing traffic 208a–n and switching fabric 205. Depending on the degree of lower level aggregation, incoming traffic 201a–n may be traffic from a single physical line, multiple physical lines, a single adapter card or multiple adapter cards.

The switch fabric 205 is may be broken down into smaller switching planes 209a–h. Each ingress and egress port 204a–n, 206a–n has one switch channel (e.g., 210a–210h) to each switching plane 209a–h such that any switching plane 209a–h may accept network traffic from any ingress port 204a–n and direct it to any egress port 206a–n. The bandwidth of the switch is proportional to the total number of switch planes 209 within the switch fabric 205. Central to the overall performance of the switch is a scheduler (not shown) which grants permission to each ingress port 204 to send network traffic to the switch fabric 205.

Some prior art designs only have one scheduler per switch fabric 205. Unfortunately, a single scheduler can only schedule a single set of paths from the ingress ports 204 to the egress ports 206. As a result different packets or cells; cannot simultaneously use the multiple switch planes 209a–h which forces the switch planes 209a–h to switch multiple parts of the same cell. This reduces reliability and prevents scaleable operation.

SUMMARY OF THE INVENTION

An apparatus is described comprising an ingress port, a plurality of switch planes having a dedicated scheduler, each of the switch planes communicatively coupled to the ingress port. Also, a method is described comprising queuing traffic at an ingress port, requesting switch plane service for the traffic across a plurality of switch planes, and scheduling the traffic independently at each of the switch planes.

The other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements, and in which:

FIG. 10a shows a translation from switch frame service request to priority level.

FIG. 10b shows preference ranking schemes for multicast and unicast preferred modes.

DETAILED DESCRIPTION

Figure 1:
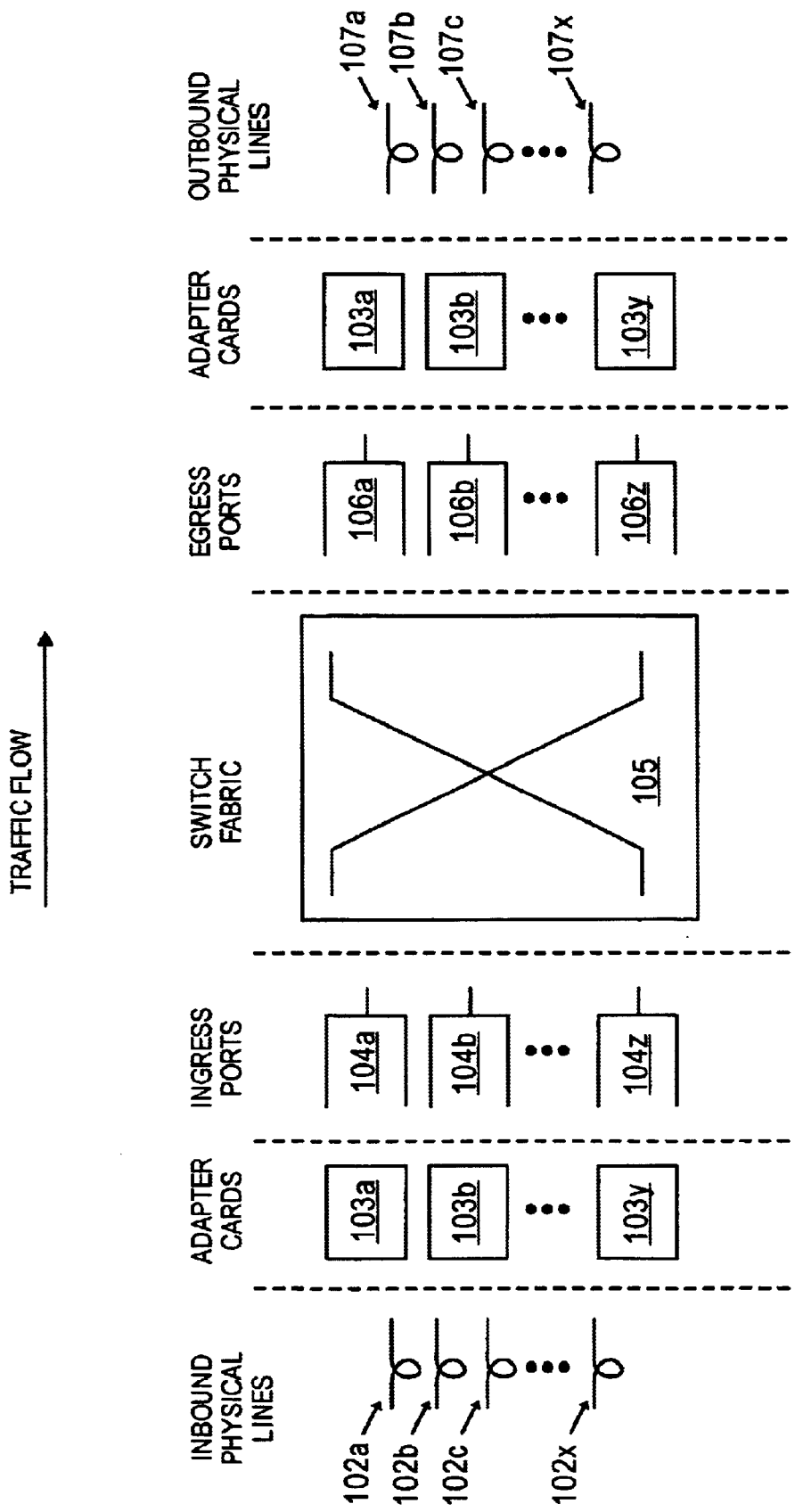
FIG. 1 shows an architectural perspective of a typical networking switch.
Figure 2:
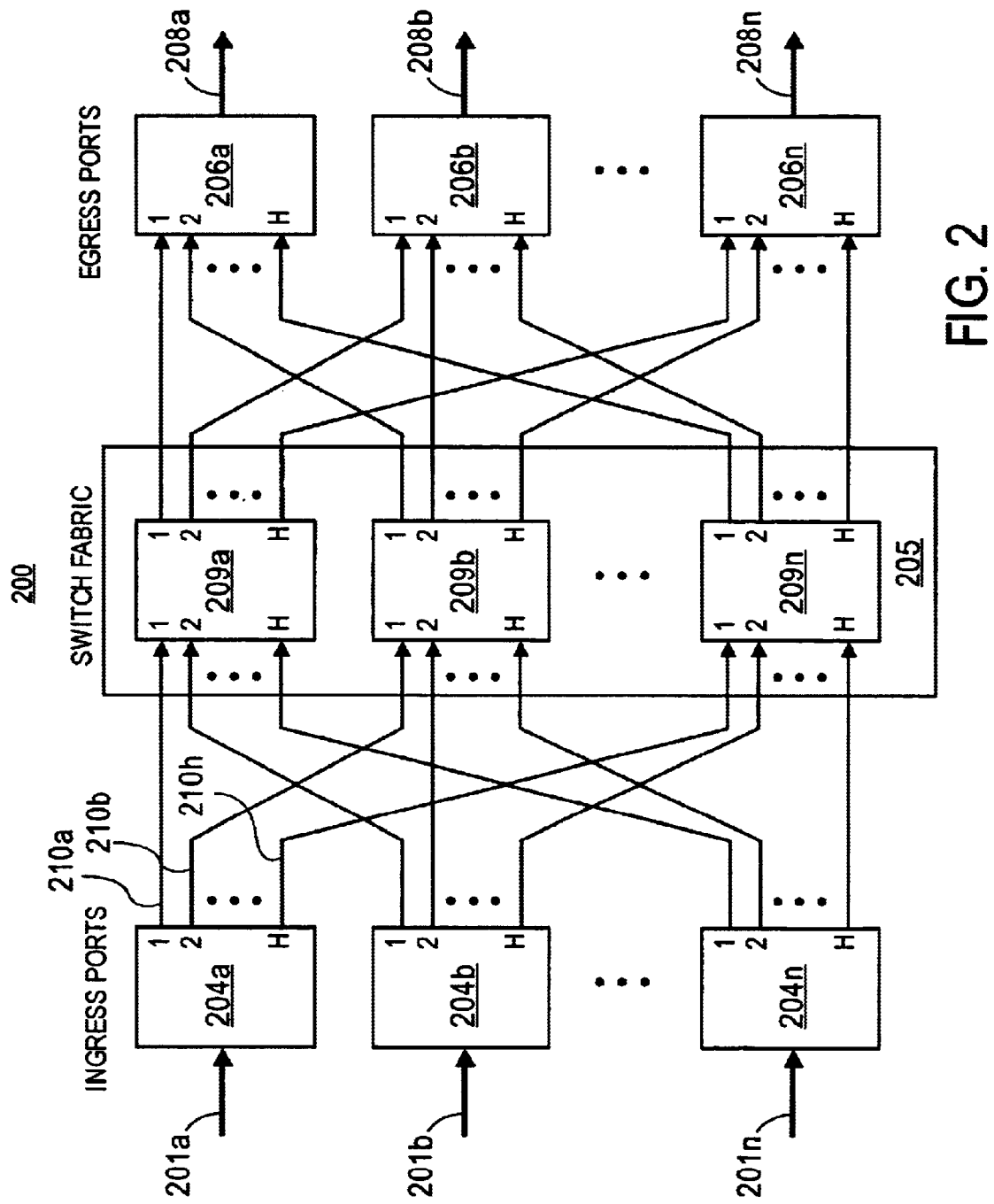
FIG. 2 shows a generic design of the switch shown in FIG. 1.

An apparatus is described comprising an ingress port and a plurality of switch planes where each of the switch planes has a dedicated scheduler and each of the switch planes is communicatively coupled to the ingress port. The switch planes may further have at least one input control port and at least one output control port where each of the input control ports are coupled to each of the output control ports in a crossbar arrangement. The communicative coupling may further comprise one of the input control ports coupled to the ingress port. Furthermore, the ingress port may have at least one unicast queue which is dedicated to a specific egress port. The ingress port may also have a multicast queue. The dedicated scheduler may further comprise a pointer to determine priority between multicast and unicast traffic, a pointer to determine priority between contending input control ports having multicast traffic and/or a pointer for each of the output control ports to determine priority between contending input control ports having unicast traffic. The apparatus may also further comprise a plurality of ingress ports where each of the ingress ports is communicatively coupled to one of each of the input control ports.

A further apparatus is described where the ingress port has a request controller and the request controller is coupled to a unicast queue and a multicast queue and the request controller also has a mapping unit configured to map a service request for the unicast and multicast queues. This further apparatus also has a plurality of switch planes where each of the switch planes has a dedicated scheduler and each of the switch planes is communicatively coupled to the request controller in order to receive the requests. The mapping unit may further configured to simultaneously map a plurality of service requests organized into a frame. Frames may also further comprise a request type field for indicating unicast traffic requests are within the unicast frame.

Another apparatus may further comprise a plurality of unicast queues where each of the service requests to one of each of the unicast queues. Each of the request fields may indicate a request for primary or secondary service as well as a request for speed up or no speed up. The frame may further comprise a multicast frame for requesting service for traffic queued in the multicast queue and the frame may also have a request type field for indicating multicast traffic requests are within the multicast frame. This apparatus may further comprise a plurality of egress ports coupled to each of the plurality of switch planes each of the service requests corresponding to one of each of the egress ports. Each of the request fields may indicate a request for speedup or no speedup. The frame may further comprise traffic whose previous request for service was granted. The traffic may be ATM traffic.

Also, a method is described comprising queuing traffic at an ingress port, requesting switch plane service for said traffic across a plurality of switch planes and scheduling said traffic independently at each of said switch planes. The method may further comprise queuing unicast traffic into a unicast queue or queuing unicast traffic into a plurality of unicast queues. Furthermore, each of the plurality of unicast queues may correspond to an egress port. The requesting of switch plane service may further comprise spreading service requests for the traffic in a round robin fashion across the plurality of switch planes. It may also further comprise spreading service requests for the traffic in a round robin fashion across the plurality of switch planes where each of the service requests indicate either a request for primary service or a request for secondary service. It may also further comprise mapping service requests for queued cells into frames.

The method may also comprise a plurality of unicast queues wherein one of the frames is sent to each of the switch planes per cycle where one of the service requests exists per unicast queued cell and the mapping is performed in an independent per queue round robin fashion across the plurality of switch planes. The method may also further comprise a plurality of unicast queues wherein a head of line unicast queued cell is mapped as a primary request and non head of line unicast queued cells are mapped as secondary requests. Also there may be a plurality of unicast queues wherein all of the queued cells of one of the unicast queues are mapped as primary requests.

The method may also queue multicast traffic into a multicast queue. Furthermore, one of the frames may be sent to each of the switch planes per cycle where one frame exists per queued multicast cell. Multicast cells may be mapped only as a primary requests. The multicast traffic may be queued into a multicast queue and unicast traffic may be queued into a plurality of unicast queues where each of the plurality of unicast queues corresponds to an egress queue. The head of line unicast cells may be mapped as primary requests, non head of line unicast cells may be mapped as secondary requests and the head of line multicast cell may be mapped as a primary request.

There may also be a plurality of request fields where each of the request fields correspond to an egress port. The requesting switch plane service may further comprise including traffic whose prior request was granted. The traffic may be a combination of multicast traffic and unicast traffic and the requesting of switch plane service may further comprise a prior resolution of conflict between multicast and unicast traffic. The traffic may be ATM traffic and the cells may be ATM cells. The frames may comprise multicast frames and unicast frames.

Another method is described comprising sending service requests to a plurality of switch planes such that each of the switch planes independently execute a scheduling method and each of the scheduling methods comprise: 1) a request phase wherein a plurality of input control ports request connection from a plurality of output control ports; 2) a grant phase wherein the plurality of output control ports at least partially grant the requests and 3) an accept phase wherein those input control ports having received at least one of said grants accepts a grant. Each of the input control ports may be communicatively coupled to the plurality of ingress ports such that each of the ingress ports sends service requests to an input control port. The request phase may further comprise translating the service requests to a connection request prior to requesting connection where the service requests have egress port information and each of the connection requests is sent to the appropriate egress port for each of the service requests. The connection requests may further comprise high priority connection requests, cell available connection requests and low priority connection requests, where the grant phase further comprises independent execution at each of the output control ports and each of the independent executions grant high priority connection requests before the cell available connection requests and grant the cell available connection requests before low priority connection requests.

Translating may further comprise translating a primary with speed up request to a high priority connection request, translating a primary without speedup service request to a cell available connection request and/or translating further comprises translating a secondary request to a low priority connection request.

The grant phase may further comprise independent execution at each of the output control ports. The grant phase may also further comprise each of the output control ports only issuing one grant per cycle. The grant phase may further comprise an output control port referring to a pointer to determine whether to grant a unicast connection request or a multicast connection request. The output control port may refer to a pointer to determine which of a plurality of multicast connection requests to grant. The output control port may also refer to a pointer to determine which of a plurality of unicast connection requests to grant. The accept phase may further comprise each of the input control ports only issuing one said grant per cycle. The input control port may refer to a pointer to determine whether to accept a granted unicast connection request or a granted multicast connection request. The input control port may refer to a pointer to determine which of a plurality of granted multicast connection requests to accept. The input control port may refer to a pointer to determine which granted unicast connection request to accept.

The scheduling method may further comprise a second request phase, a second grant phase and a second acceptance phase such that only those input control ports having not received any of the grant phase grants participate and only those output control ports having not received any of the acceptance phase acceptances participate. The scheduling method may further comprise a third request phase, a third grant phase and a third acceptance phase such that only those input control ports having not received any second phase grants participate and only those output control ports having not received any second acceptance phase acceptances participate.

Figure 3:
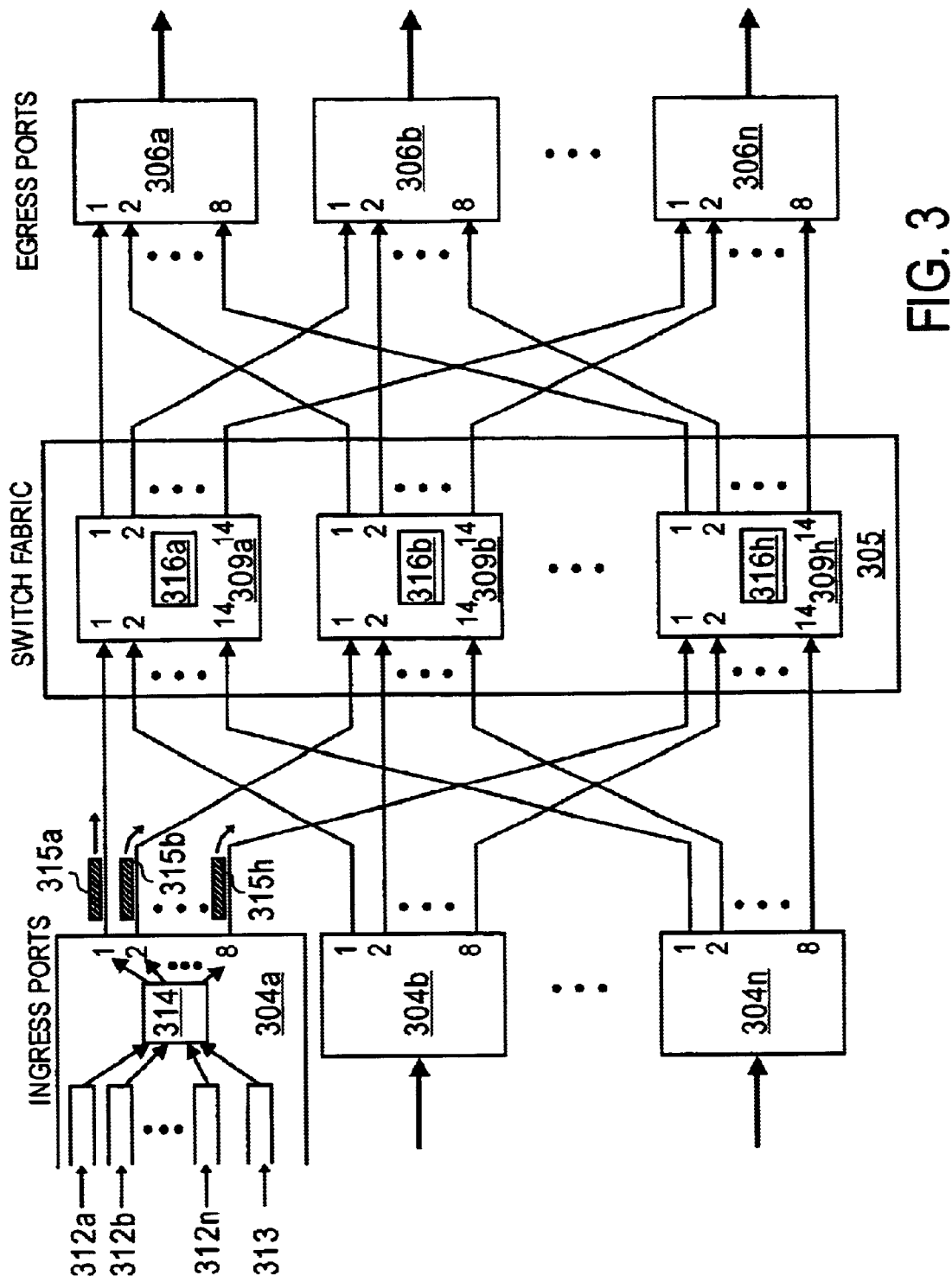
FIG. 3 shows a switch architecture having multiple independent schedulers.

FIG. 3 shows an embodiment of a switch architecture 300 having multiple independent schedulers 316a–h. In the particular embodiment of FIG. 3 there are 14 ingress/egress ports 304a–n/306a–n and 8 switch planes 309a–h within switch fabric 305. Other embodiments may include more or fewer ports or switch planes 309 as the number of ports 304, 306 and the number of switch planes 309 are independent of each other. Also, the architecture described herein is inherently expandable to any number of ports and any number switch planes. Thus n and h may be any value even though 14 and 8 have been chosen respectively for these values as to this discussion.

Furthermore, the following figures and discussion relate only to an ATM switch where the incoming and outgoing network traffic is in the form of ATM cells. However, it is evident that the general approach described herein is applicable to any technology that organizes data into packet or packet-like data structures. Packet switching is applicable to many different technology areas besides ATM including other networking related technologies (such as ethernet or any H.323 based technology) as well as computing related technologies.

As discussed in the background, ingress ports 304a–n are architectural levels that send network traffic to the switch fabric 305. Egress ports 306a–n are architectural levels that collect network traffic from the switch fabric. Also, switch planes 309 are the basic building blocks of a switch fabric 305. Switch planes 309 are logic units capable of directing incoming traffic from a number of different inputs to any of a number of different outputs. The more switch planes 309 used to build a switch fabric, the more bandwidth the switch fabric has. Typically switch planes are implemented in a crossbar arrangement which means there is a channel between every switch plane input and every switch plane output. Other switch plane embodiments may be implemented, for example, in a Banyan arrangement rather than a crossbar arrangement.

FIG. 3 shows associated with ingress port 304a: 1) a set of unicast queues 312a–n; 2) a multicast queue 313 and 3) a request controller 314. It is to be understood that the other ingress ports 304b–m have a similar design; however, for purposes of simplicity as to FIG. 3 only ingress port 304a is drawn with these features. A unicast queue 312 queues unicast ATM cells while a multicast queue 313 queues multicast ATM cells. A unicast ATM cell is an incoming ATM cell having only one destination egress port 306. A multicast ATM cell is an incoming ATM cell having more than one destination egress port 306, thus multicast ATM cells require some form of duplication within the switch so that each applicable egress port 306 has its own ATM cell. In one of the embodiments discussed herein, the duplication occurs after an incoming cell leaves the ingress port 304. Thus only one multicast ATM cell is transported through the ingress port and sent to the switch fabric. Unicast ATM cells implement point to point ATM connections while multicast ATM cells implement point to multipoint connections such as teleconferencing. Again, this approach is not limited to ATM but any packet or cell based approach.

For one embodiment, there is one unicast queue 312a–n for each egress port 306a–n. That is, the destination (i.e., an egress port 306) of each incoming unicast cell is identified before the cell is queued in a unicast queue 312. Cells are binned in a specific unicast queue 312 dedicated to cells destined only for a specific egress port 306. For example, an incoming ATM cell destined for egress port 306b is binned in unicast queue 312b while an ATM cell destined for egress port 306n is binned in unicast queue 312n. All incoming multicast cells, regardless of destination (i.e., egress port 306) are binned in the multicast queue 313. Other embodiments may use more than one unicast queue per egress port; or more than one multicast queue. So doing will allow the switch to handle more traffic load before dropping cells. If such multiple queue per egress port or multiple multicast queue embodiments are implemented, the sequencing of the cells should be organized and tracked.

In the embodiment of FIG. 3, the request controller 314 is responsible, at each appropriate clock tick, for selecting queued cells and then issuing service requests to the switch fabric 305 by the next appropriate clock tick. The general perspective is that each queued cell is its own entity that must first request (and then be granted) service by the switch fabric 305 before the switch fabric 305 switches the cell. A service request (also referred to as a request) is a form of communication between an ingress port 304 and the switch fabric 305 where the switch fabric 305 is in some manner asked to switch a cell currently queued in the ingress port 304. For one embodiment, the switch fabric 305 is only aware of the cell's destination and does not need to know where on the ingress port 304 the cell is located.

The request controller 314 is responsible for implementing service requests for appropriate cells. The request controller 314 selects which cells are to request service and then implements the service request process for the selected cells. Thus the request controller may have an organization of logic gates, referred to as a mapping unit, that maps the various requests in an organized manner. A map is any organized presentation of service requests. The specific logic design of the mapping unit may vary depending on the form of map employed. Furthermore, logic designs may vary simply due to design choices or preferences made by the designer. One skilled in the art may readily design any mapping unit as only ordinary circuit design skills are involved. Usually, the selection and implementation processes are executed within each clock cycle. Clock cycle boundaries are marked at sequential clock ticks. Thus terms like "clock tick" and "cycle" refer to the system's periodic operation.

Before describing the request controller's cell selection process, an embodiment of a service request implementation process (i.e., mapping) will first be described. That is, an organized manner in which service requests are sent to the switch fabric 305 will be first described. In the example of FIG. 3, the request controller 314 constructs a switch frame 315a–h that is sent to each switch plane 309a–h on each clock tick. Each switch frame contains service requests for selected cells queued in the ingress port. In the embodiment of FIG. 3, the request controller 314 sends 8 switch frames 315a–h on every clock tick. As switch frames 315a–h are physically sent to the switch planes 309a–h, the ingress port 304a is communicatively coupled to switch planes 309a–h. That is, a platform exists such that the ingress port 304a can issue service requests to the switch planes 309a–h and the switch planes 309a–h may respond to the service requests. These platforms may be point to point channels between the ingress ports 304 and switch planes 309. Because the request controller 314 constructs the switch frames, ultimately the switch planes 309a–h are also communicatively coupled to the request controller 314 as well. Any of a number of various applicable means within the art may be used to communicatively couple the ingress port 304a (or request controller 314) to the switch planes 309a–h.

Essentially, every switch plane 309a–h has it own dedicated scheduler 316a–h. The dedicated schedulers 316 decide which cell, on the next clock tick, will actually enter its corresponding switch plane 309 for switching. A scheduler 316 is responsible for organizing connections between a switch plane's inputs and its outputs. Thus, if a switch plane has a dedicated scheduler (e.g., dedicated scheduler 316a of switch plane 309a), the switch plane itself (e.g., 309a) is capable of organizing the connections between its inputs and outputs. Referring back to the background, past designs used one scheduler for a plurality of switch planes which limited the capability of the switch fabric. By having independent schedulers, each switch plane has the intelligence to manage its own traffic which ultimately improves system throughput. From here on, multiple terms will be used to refer to the dedicated schedulers. These include: independent scheduler, scheduler, switch plane scheduler, etc. It is to be understood that these terms are all synonymous with the term "dedicated scheduler".

As discussed, each switch frame 315a–h contains service requests for those queued cells the request controller 314 has identified as needing switching service from the corresponding switch plane 309a–h the switch frames 315a–h are sent to.

There are two selection processes: 1) A first selection process, hereinafter referred to as an ingress port selection process, that selects which of the queued cells will request service from the switch fabric 305 and also what degree of service will be requested; and 2) a second selection process, hereinafter referred to as a switch plane selection process, that selects which of the aforementioned requests are to be granted. The ingress port selection process has already been briefly referred to as a selection process executed by the request controller 314. Also, in the embodiments discussed herein, each switch plane 309a–h executes its own switch plane selection process (via its dedicated scheduler 316a–h) independently of the other switch planes. For this reason, FIG. 3 shows each switch plane 309a–h having its own corresponding scheduler 316a–h. The switch plane selection process is an integral part of the independent scheduler's operation. That is, granting service requests is a component of organizing connections between a switch plane's input and its output.

As the embodiment shown in FIG. 3 shows each ingress port 304a–n having a set of unicast queues, a multicast queue and a request controller (not shown for ingress ports 304b–n), each ingress port 304a–n sends switch frames (e.g., 315a–h) to each switch plane scheduler 316a–h. A switch frame (e.g., 315a) is a form of map, i.e., an organized presentation of service requests. On every appropriate clock tick, every switch plane scheduler 316a–h receives a switch frame 315a–h from every ingress port 304a–n producing a total of n×h switch frames per clock tick. The collection of multiple switch frames (e.g., 315a–h), as a whole, sent by an ingress port on a clock tick is also a form of map. In the embodiment of FIG. 3, 14×8=112 switch frames are sent to the switch fabric 305 per clock tick. Ideally, each independent scheduler 316a–h fully responds to each request controller 314 before the next clock tick. Thus on the next outgoing switch frame, the request controller may include the previous cycle's granted ATM cell (if any).

In the embodiment discussed herein, each switch plane 309a–h may transport one cell to each egress port 306 per clock tick. Thus, in the embodiment of FIG. 3, each switch plane 309 has the bandwidth to switch 14 cells (one to each egress port 306) per clock tick. As the total number of requests coming from the n×h (14×8) switch frames 315 per clock tick may exceed the available bandwidth of the switch fabric 305, sometimes requests are not granted. The process the independent schedulers 316 execute in determining which cell requests are granted is also discussed in more detail further ahead. The request controllers 314, switch planes 309 and switch plane schedulers 316 should all operate synchronously with one another.

Figure 4A:
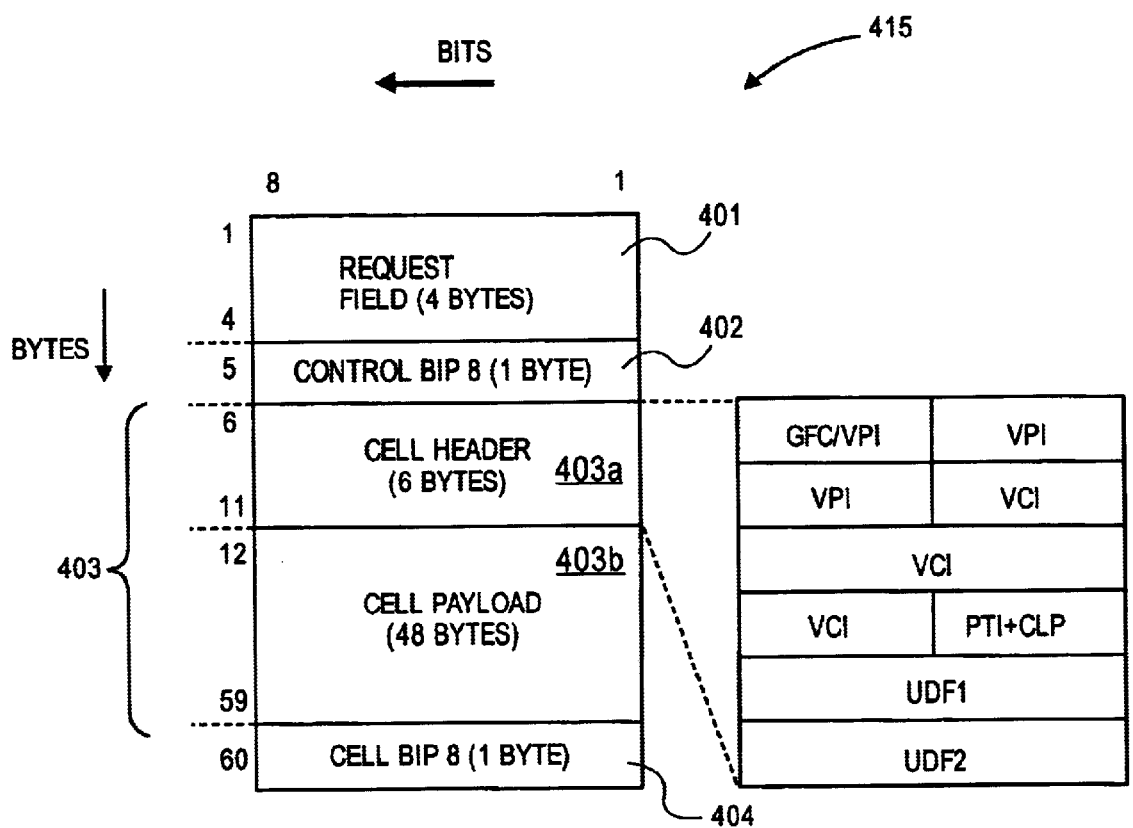
FIG. 4a shows a switch frame format.

An embodiment of a switch frame format 415 is shown in FIG. 4a. As discussed, h switch frames 415 (e.g., 8 in the embodiment depicted in FIG. 3) are sent per ingress port per clock tick in the embodiment shown in FIG. 3. In this embodiment, the switch frame 415 is 60 bytes which includes: 1) a four byte request field 401;2) an error control byte 402 for the four byte request field 401; 3) the previous cycle's granted ATM cell 403 (54 bytes=6 bytes header 403a and 48 bytes payload 403b) and 4) an error control byte 404 for the ATM cell 403. The four byte request field 401 contains the aforementioned requests for those cells the request controller decides need service from the specific switch plane the switch frame 415 is directed to. Its size depends upon the number of unicast queues—thus as the switch architecture varies so too may the size of the request field 401. A null cell may be inserted into the ATM cell 403 space if no grant was obtained in the previous cycle. Other embodiments of the switch frame are possible. For example, some switch frames may not include an ATM cell.

Again, the details of an ingress port selection process executed by the request controller is discussed ahead (including a discussion of a specific mapping process that produces request field 401). Both error control bytes 402, 404 are used to ensure that bits within their corresponding fields are not corrupted during the switch frame transmission process. Various error detection schemes may be employed such as CRC or BIP. The ATM cell 403, as discussed, is the cell granted by the switch plane from the previous cycle's request. No oversubscription exists at the switch plane level as each switch frame 415 may carry one granted cell 403 and each switch plane receives 14 switch frames 415 per clock tick (in this embodiment). That is, there are 14 cells of offered load per clock tick and, as discussed, each switch plane can service 14 cells per clock tick.

The Request Controller and the Ingress Port Selection Process

Figure 4B:
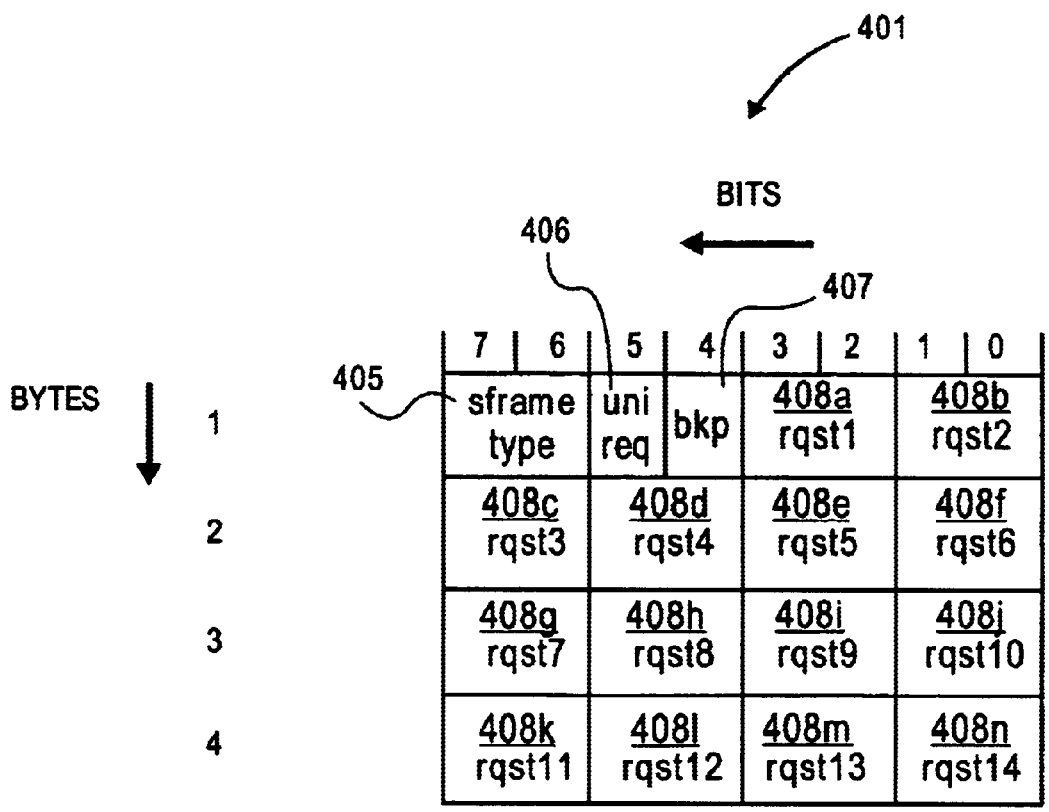
FIG. 4b shows a switch frame request field format.

Next is the discussion concerning the request controller's cell selection process (i.e., the ingress port selection process). As cell selection and mapping are somewhat integrated, more specifics of a mapping embodiment are also discussed. FIG. 4b shows a more detailed view of an embodiment of the switch frame request field 401 of FIG. 4a. There are four basic parts of this switch frame request field 401: 1) the switch frame type field 405; 2) the switch frame request type bit 406; 3) the backpressure bit 407 and 4) service requests 408a–n.

The switch frame type field 405 indicates the type of switch frame being transmitted. A switch frame type field 405 value of 00 means the frame has null cells (i.e. empty cell spaces that do not contain real customer traffic) while a value of 10 means the switch frame has valid data cells. The switch frame request type bit 406 indicates the switch frame type. Referring briefly back to the embodiment of FIG. 3, there are two different types of switch frames 315: unicast and multicast that corresponds to unicast queues 312a–n and multicast queue 313, respectively. Essentially, unicast switch frames carry requests for service of unicast traffic (i.e., the cell(s) queued in the unicast queues 312a–n) while multicast switch frames only carry requests for service of multicast traffic (i.e., cell(s) queued in the multicast queue 313). As discussed, a multicast cell has multiple destination egress ports (e.g., to realize point to multipoint traffic) whereas unicast traffic only has one destination egress port (e.g., to realize point to point traffic).

In this embodiment, both unicast switch frames and multicast switch frames are a map of service requests for queued cells to their proper egress ports 306 within a single switch frame. A difference between multicast and unicast switch frames, however, is multicast switch frames carry an egress port map for a single queued cell while unicast switch frames may carry the egress port map for each of a plurality of different queued cells. Thus, in this embodiment, a single multicast switch frame is capable of requesting service for at most one queued multicast cell while a single unicast switch frame is capable of requesting service for more than one unicast queued cell. Thus, part of the mapping sequence described in this embodiment involves specific frame bit positions that correspond to specific egress ports.

Figure 5:
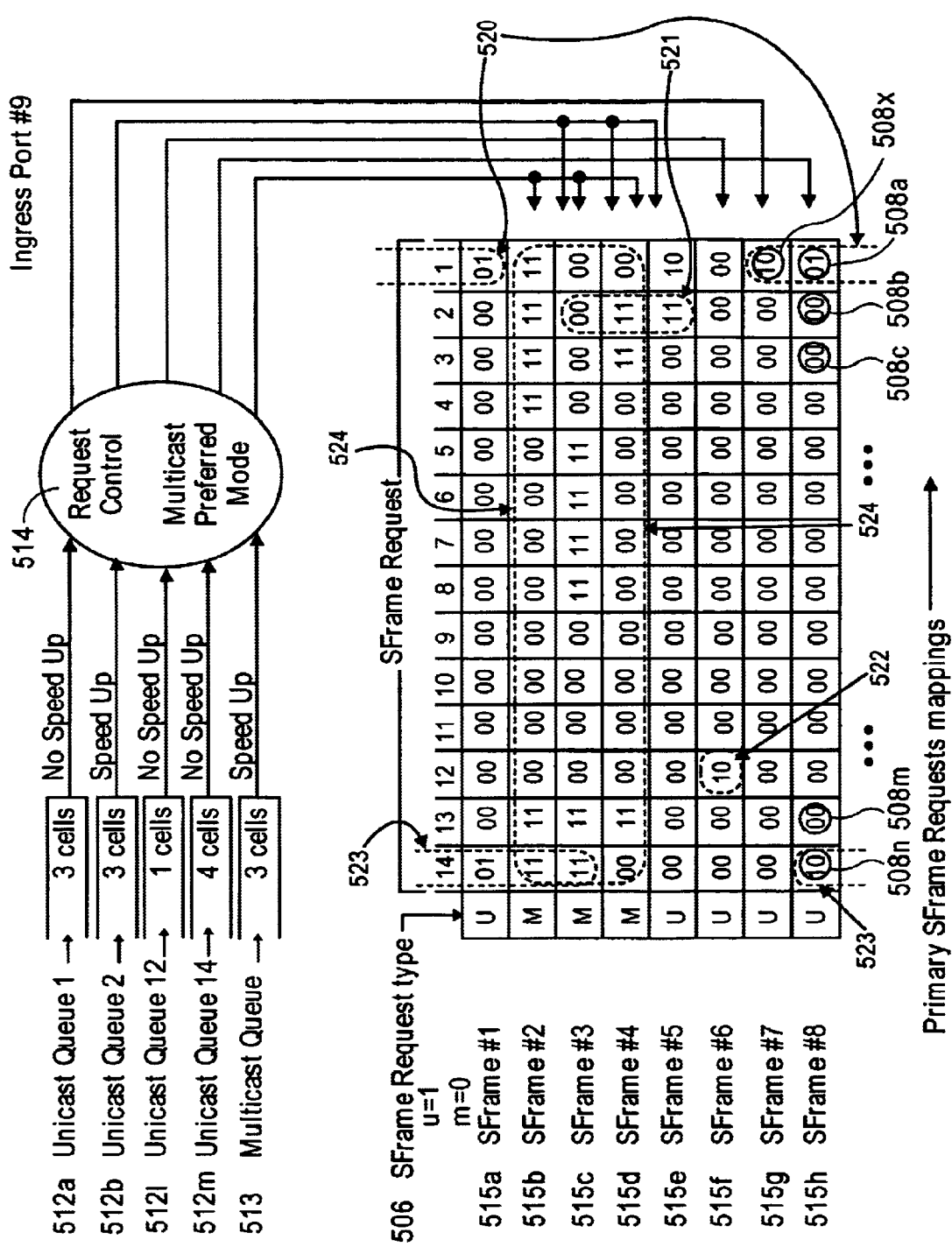
FIG. 5 shows a service request mapping.

Thus multicast switch frames map the service requests for the multiple destination egress ports of a single incoming cell queued in the multicast queue. Referring to FIG. 5 as an example, there are three queued multicast cells. Because the multicast queue 513 is in speedup mode, as discussed later, the request controller 514 will request primary service for all three multicast cells. Switch frames 515b, 515c, 515d correspond to these requests. That is, switch frame 515b is the request for the first cell in the multicast queue 513. Switch frames 515c and 515d correspond to the requests for the second and third cells respectively. Switch frame 515b indicates that the first multicast cell is destined for egress ports 1,2,3,4,13 and 14. Switch frames 515c and 515d indicate that the second and third multicast cells must be sent to egress ports 5,6,7,8,13,14 and 2,3,13 respectively.

Unicast switch frames 515a, 515e–h similarly map the service requests for a queued cell to its egress port. Multiple cells may request service via a unicast switch frame. As unicast traffic is queued according to egress port (i.e., there is a unicast queue for each egress port), unicast switch frames simply map the service requests for queued cells according to their unicast queue/egress port. Referring to FIG. 5 again as an example: switch frames 515a, 515e–h are unicast switch frames. Switch frame 515a is requesting service for two unicast cells, one destined for egress port 1 the other for egress port 14; switch frames 515e, 515f, 515g are requesting service for only cell each that is destined for egress port 2, 12 and 1 respectively; switch frame 515h (similar to switch frame 515a) is requesting service for two unicast cells, one destined for egress port 1 and the other for egress port 14.

FIG. 5 also shows varying degrees of service request. Determining which cells receive which degree of service request is a part of the ingress port selection process. That is, service requests are comprised of a two bit field (e.g. service requests 508a–n of switch frame 515h), that are used to request service for each egress port within each switch frame. Thus, in this emodiment, there are four different service request states (00, 01, 10 and 11). 00 simply means there is no cell requesting service for that egress port. For example, switch frame 515h is not requesting any service for egress ports 2 through 13.

A service request value of 01 corresponds to a secondary request while a value of 10 corresponds to a primary request. Basically, service requests are classified as primary or secondary. As discussed in further detail ahead, primary service requests are typically granted service by the scheduler before secondary service requests are granted service. For this embodiment, all multicast service requests are classified as primary (resulting in no secondary multicast service requests).

A service request value of 11 corresponds to a primary request with speedup. In order to best understand speedup, a further discussion concerning a mapping method of the request controller for selecting which cell requests are placed in which switch frame is necessary. Such a discussion, including more elaboration on the primary/secondary classification follows.

Figure 4C:
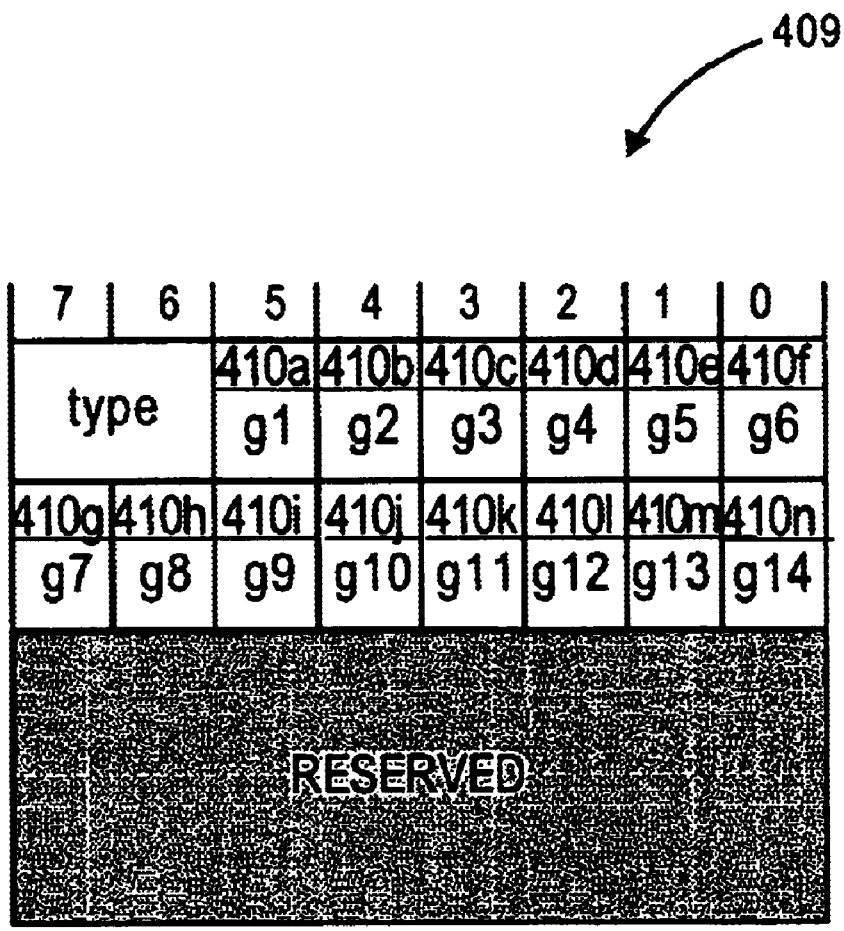
FIG. 4c shows a grant frame format.

As discussed, in reference to the embodiments shown in FIGS. 4 and 5 there is one service request 408a–n; 508a–n for each egress port (which is also equal to the number of unicast queues). The request controller 514 (314 referring briefly back to FIG. 3) attempts to prioritize the queued traffic such that cells less tolerant to delay submit primary service requests while those cells more tolerant of delay submit secondary service requests.

Typically, cells at the head of the line in a queue (i.e., the next outgoing cell when the queue is serviced) are less tolerant of delay as they have waited the longest for service. Thus in one embodiment, the request controller deems cells waiting at the head of each unicast queue as priority. As a preliminary example (and in reference to FIG. 3), if only eight unicast queues (such as unicast queues 312a–h feeding request controller 314) have queued traffic while remaining unicast queues 312i–n are empty, the request controller 314 will identify eight cells as priority cells (the head of line cell in each of the eight unicast queues 312a–h). After identifying these eight priority cells the request controller generates eight primary service requests which are subsequently mapped into the switch frames. All other unicast queued traffic is non-priority and therefore generates secondary service requests. These are also mapped into switch frames where possible. As discussed below, the independent schedulers 316a–h are designed to tend to favor primary service requests when issuing grants for service.

FIG. 5 shows a more complicated example in order to better understand how specific primary and secondary service requests are mapped into specific switch frames (for this embodiment). FIG. 5 shows an ingress port (ingress port 9) having 5 queues (4 unicast queues 512a, b, l, n and the multicast queue 513) containing a total of 14 cells of queued traffic. Unicast queues 512a, 512b, 512l, 512n have 3, 3, 1 and 4 cells respectively while the multicast queue has 3 cells.

The request controller 514 identifies the initial switch frame for each queue. The initial switch frame is the switch frame where the first cell of the serviced queue is mapped. Furthermore, as discussed, the first cell is also a priority cell which generates a primary service request. Thus the initial switch frame comprises a primary service request that corresponds to the first cell in the queue. The remaining cells in the queue are non-priority cells and thus generate secondary service requests. These remaining cells are mapped sequentially in a round robin fashion across the following switch frames, one secondary request per switch frame.

FIG. 5 shows the service request mapping 520 for unicast queue 512a. Unicast queue 512a has 3 cells. As discussed ahead, the initial switch frame is determined to be switch frame 515g. Thus switch frame 515g has a primary service request (for the head of line priority cell) in the service request space 508x corresponding to unicast queue 512a/ egress port 1. The remaining two non priority cells generate secondary service requests that are mapped into switch frames 515h and 515a respectively. The wrap around from switch frame 515h to 515a completes the notion that the service requests are mapped in a round robin fashion.

The specific switch frames may be determined by the following:

Switch Frame# = 
$$1 + \text{remainder}\left[\frac{(\text{ingress port number}) + (\text{offset}) + (\text{position in queue})}{(\text{number of switch planes})}\right]$$ [Eqn. 1]

Thus in the foregoing example in reference to FIG. 5, the ingress port number is 9 and the number of switch planes is 8. The position in queue values are 0,1,2 for the priority cell and two remaining cells respectively—thus the initial switch frame number corresponds to a "position in queue" value of 0. "Position in queue" values increase with each additional cell in the queue. Thus this term may vary as:

Position in queue=0,1,2,3, . . . ((number of cells in queue)−1)$|_{max = ((number\ of\ switch\ planes)−1)}$ [Eqn. 2]

Note that the total number of "position in queue" values should be limited to the number of switch planes. Otherwise, if higher values were allowed, deep secondary cells could undesirably map into switch frames already containing requests for the queue and thus map over earlier requests. Furthermore, if queue depths less than the number of switch planes were used, there could be instances where cells were not serviced even though the switch fabric had enough capacity to do so. For this reason it is also recommended that the queue depth of each queue at least equal the number of switch planes.

Continuing with a discussion of Equation 2 in regard to unicast queue 512a of FIG. 5, the offset of the initial switch frame 515g could have been any number equal to 5, 13, 21, 29, . . . etc. However, for simplicity a modulo equal to the number of switch planes is similarly recommended (in this case, 8). The offset corresponds to the switch frame number that last submitted a request for the queue. Thus in this example, switch frame 515f was the last switch frame to request service for unicast queue 512a. It is important to note that switch frame numbers, position in queue values and offsets are calculated/tracked for each individual unicast queue 512a–n by the request controller 514. Thus the request controller 514 effectively maps or spreads service requests across all the switch planes for each unicast queue 512a–n on an individual round robin basis that is independent of other queues. In other words, service requests are mapped across the switch planes in a round robin fashion for each queue independently.

The previous discussion concerning the mapping 520 of service requests for unicast queue 512a concerned a basic example of unicast queue mapping. However, as discussed there may be two frame types: unicast and multicast. As the Switch Frame Request Type 506 values indicate in FIG. 5, switch frames 515a, 515e–h are unicast type frames while switch frames 515b–d are multicast type frames. As previously mentioned, multicast frames have a representation of all the destinations for a single multicast cell. Thus unicast type frames may carry service requests for more than one queued cell while multicast frames may carry service requests for a single queued cell.

As, in this embodiment, all multicast requests are primary, there is no distinction between primary or secondary service requests for multicast cells. Furthermore, switch frame 515b corresponds to the multicasting schedule for the first queued cell in the multicast queue (since, in this example, the offset (not shown) of multicast queue 513 is 0) while switch frames 515c and 515d correspond to the multicasting schedule for the second and third cells in the multicasting queue.

Similar to the unicast queues 512a–n, the request controller 514 effectively maps or spreads multicast service requests across all the switch planes for the multicast queue 513 on an individual round robin basis that is independent of the other queues. Thus multicast service requests are mapped across the switch planes (via switch frames 515a–h) in a round robin fashion independently.

For clarity, unicast request mapping is compared to multicast request mapping for this embodiment. A unicast queue (e.g., unicast queue 512a) typically generates, in a round robin fashion, a total number of service requests per clock tick equal to the total number of queued cells and, furthermore, typically generates one primary request (corresponding to the head of line cell) with the remaining requests (corresponding to the non head of line cells) being secondary.

By comparison, a multicast queue 513 also generates across all switch frames in a round robin fashion, a total number of service requests equal to the total number of queued cells. However, all multicast queued cells generate primary requests including non head of line as well as head of line cells.

As between multicast requests and unicast requests, competition for service within a particular switch frame is possible since each queue has its service requests independently mapped. Resolving this contention is another part of the ingress port selection process. An example of contention is seen in FIG. 5. The desired service request mappings 521, 522, 523 and 524 are shown for unicast queues 512b, 512l, 512n and multicast queue 513, respectively. Note that the multicast queue service request mapping 524 consumes entire switch frames 515b–d while the unicast queue service request mappings 520–523 only consume the section of the switch frame that corresponds to their unique unicast queue/ egress port number. As discussed, multicast frames represent the multiple egress ports that a multicast cell is destined for—hence they may consume an entire switch frame.

Note that the intended unicast service request mappings 521 and 523 associated with unicast queues 512b and 512n overlap (i.e., compete) with the intended multicast service request mapping 524. This follows directly from the fact that each queue's service requests are tracked independently according to equations 1 and 2. Thus, the associated offsets of each queue are random when compared with one another.

In the example of FIG. 5: (1) the associated offset of queue 512a happens to correspond to a its first cell request (i.e., its initial switch frame position) being mapped into switch frame 515*h*; (2) the associated offset of queue 512*b* happens to correspond to its first cell request being mapped into switch frame 515*c*; (3) the associated offset of queue 512*l* happens to correspond to its first cell request being mapped into switch frame 515*f*; (4) the associated offset of queue 512*n* happens to correspond to its first cell request being mapped into switch frame 515*h* and (5) the associated offset of the multicast queue 513 happens to correspond to its first service request being mapped into switch frame 515*b*.

Contention between multicast and unicast mappings (e.g., unicast mappings 521, 523 with multicast mapping 524) may be resolved according to a contention resolution process such as the following: (1) primary cell requests win over secondary requests; (2) contention between primary requests is resolved in favor of the queue in speed up mode (which is discussed ahead); (3) contention between primary requests from queues in speed up mode are determined by a pointer which may either: (1) always point to favoring the unicast request(i.e., unicast preferred mode); (2) always point to favoring the multicast request (i.e., multicast preferred mode) or (3) alternate between favoring unicast and multicast requests (i.e., alternate mode).

In this embodiment, there is no overlap between unicast requests since the switch frame has space reserved for each unicast queue. Furthermore, multiple unicast primary requests may be made within a single unicast switch frame. Thus, the above described contention process is used primarily for contention between multicast mappings and unicast mappings as seen in FIG. 5.

FIG. 5 shows contention between unicast queues 512*b* and 512*n* with multicast queue 513. The primary requests of the multicast queue mapping 524 win over the last two secondary requests 530,531 of the unicast queue 512*n* mapping 523 (since primary requests win over secondary requests). Thus multicast queue 513 wins its contention for switch frames 515*b* and 515*c* over unicast queue 512*n*. Because unicast queue 512*b* is in speedup mode, the special case of speed up is next described.

Speedup accelerates service for a specific queue. Since this affects the degree of requested service, speedup is also a part of the ingress port selection process. Thus speedup applies to a queue rather than a cell. The acceleration may be triggered by any condition such as quality of service parameters or minimum queue delay requirements. For this embodiment, acceleration is achieved by ensuring that every cell within the queue is mapped as a primary service request. That is, whereas normal operation (non-speedup mode) results in only the head of line cell being mapped into a primary service request; in speedup mode, all cells within a speedup queue are so mapped.

Thus the significance of speedup in this embodiment is that: 1) for unicast queues, head of lines cells (ordinarily mapped as primary without speedup .i.e., "10") are mapped as primary with speedup (i.e., "11"); 2) also for unicast queues, non head of line cells (ordinarily mapped as secondary service requests, i.e., "01") are mapped as primary service requests with speed up (i.e., "11"); 3) for multicast cells, all cells (ordinarily mapped as primary without speedup "10") are mapped as primary with speedup (i.e., "11"). The changing binary values of the service request will be reflected in preferential treatment by the switch plane selection process as described ahead.

Referring back to FIG. 5, note that unicast queue 512*b* and the multicast queue 513 are in speedup mode. Thus, all three cells within the multicast queue have their corresponding intended request mappings (into switch frames 515*b,c,d* respectively) as primary requests with speedup (i.e., "11"). Similarly, the unicast queue 512*b* wishes to have its intended mapping 521 also employ switch frame 515*c* and 515*d*. There is no contention as to switch frame 515*e*, thus the last mapping value 532 of the unicast queue 512*b* mapping 521 is seen as primary with speedup.

The contention between unicast queue 512*b* and the multicast queue 513 as to switch frames 515*c* and 515*d* may be resolved as follows. Because both queues generate primary requests with speedup ("11") the third prong of the contention process is used. At this level, contention is determined by the mode the request controller happens to be in (unicast preferred, multicast preferred or alternate). Because, in the example of FIG. 5, the request controller 514 is in multicast preferred mode, the multicast queue 513 wins its contention over unicast queue 512*b*. Thus the multicast queue 513 gains complete access to switch frames 515*b,c,d*; unicast queue 512*b* only gains access to switch frame 515*e* (via space 521). As discussed, unicast queue 512*n* only gains access to switch frames 515*h* and switch frame 515*a*.

The mode of the request controller (unicast preferred, multicast preferred, or alternate) may be set by the operator or automatically by some form of traffic monitoring control function. In the alternate mode the request controller maintains 50%–50% fairness by toggling contention favoritism between multicast and unicast traffic. In unicast preferred mode there is 100% favoritism to unicast traffic (i.e., the unicast request always wins over the multicast traffic). In multicast preferred mode there is 100% favoritism to multicast traffic (i.e., the multicast request always wins over the multicast traffic).

When a queue loses a contention it does not receive service as to the amount of lost contention. That is, the number of cells that otherwise would have been mapped into switch frame requests will wait until the next clock tick for service request mapping. If some cells lose contention while others are not in contention (thus the queue has some cells to be serviced and others that missed service this cycle) the queue is still serviced in a FIFO fashion regardless of which cells had no contention and which cells lost contention. FIG. 5 shows an example of this. Were it not for losing contention, the head of line cell request in unicast queue 512*b* would have been mapped into switch frame 515*c*. Instead, the head of line cell request is now mapped into switch frame 515*e*.

The ingress port selection process may be implemented within a ingress port selection unit. Similar to the mapping unit, the ingress port selection unit may be implemented with logic gates in any of a number of different ways. Furthermore, since the two units work closely together, they may simply be integrated together to substantially form for the request controller.

Before moving on to the independent schedulers within the switch plane, the backpressure function must be described. Referring back to FIG. 4*b* there is a backpressure bit 407 that indicates congestion upstream. That is, the egress port may indicate congestion to the switch plane or the switch plane may indicate congestion to the request controller. The effect of the backpressure bit is to force the schedulers to refuse to send cells to this line card. Typically, each line card has an ingress side and an egress side. The congestion on the egress side may be communicated to the switch fabric, for example, via the switch frames sent by the request controller to the switch fabric. This approach, avoids requiring direct communication between the egress side and the switch fabric.

The Independent Scheduler and the Switch Plane Selection Process

Figure 6:
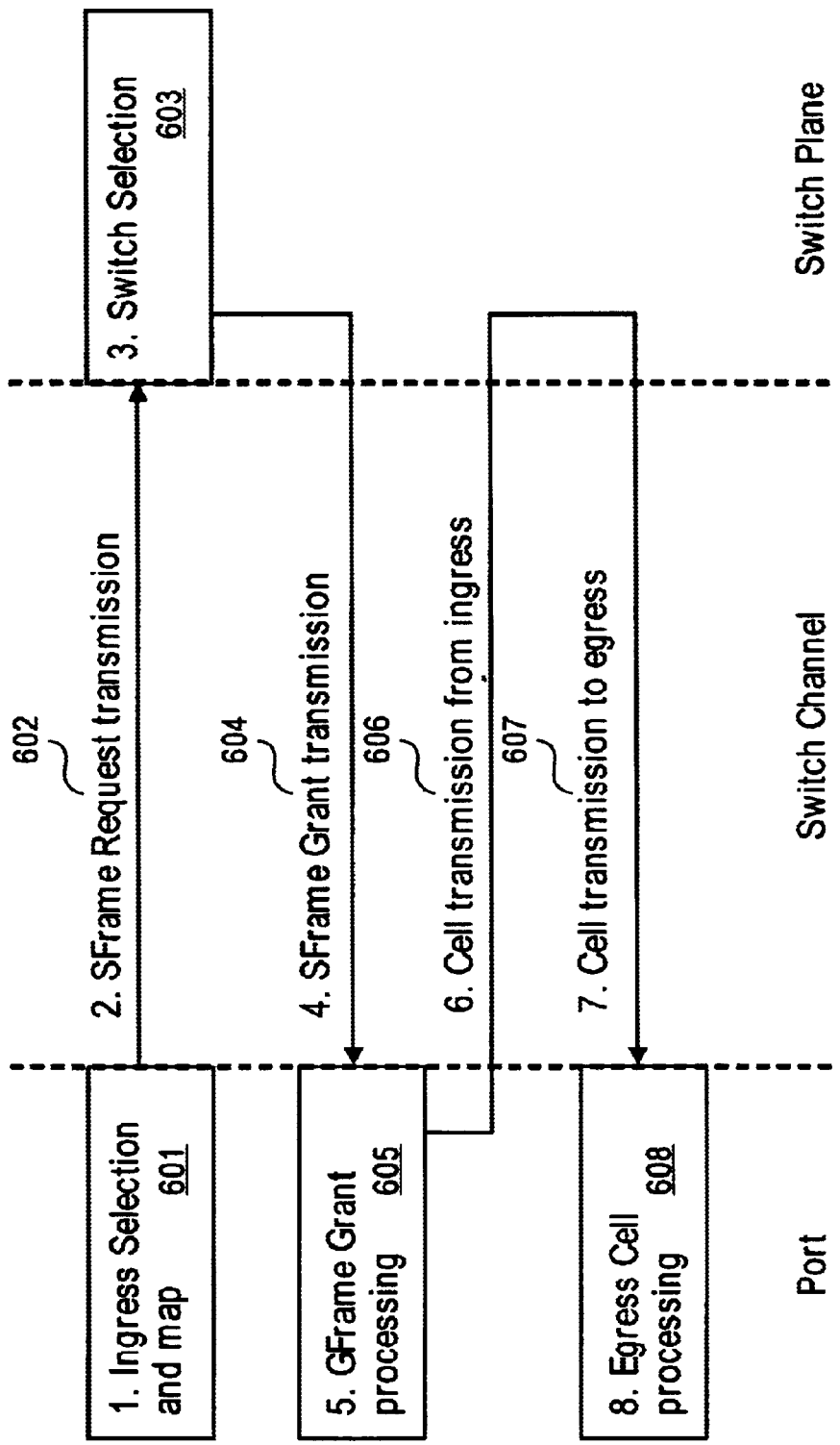
FIG. 6 shows a complete switching process.

As discussed, referring briefly back to the embodiment shown in FIG. 3, on each clock tick every independent scheduler 316 receives a switch frame from every request controller 314a–n. Typically, each switch frame contains service requests (including priority requests) for queued traffic. The independent scheduler is responsible for determining which requests are to be granted. The independent scheduler is a unit that may be implemented with any of a number of different logic designs. FIG. 6 shows a process of cell switching. First is the aforementioned ingress port selection and map process performed by the request controller which maps cell service requests into switch frames. This is labeled as 601 in FIG. 6.

Then, as discussed, switch frames (an example of the format of a switch frame appears in FIGS. 4a and 4b) are sent to each switch plane from each request controller. This sending of switch frames is labeled as 602 in FIG. 6.

Next, the switch plane selection process (the details of which are discussed ahead) is performed at each switch plane by the scheduler associated with each switch plane. The switch plane selection process is the process by which the switch plane chooses which service requests to grant. The switch plane selection process is labeled as 603 in FIG. 6.

Then, the grants are mapped into a grant frame which is sent back to each request controller. An example of a grant frame 409 is shown back in FIG. 4c. In this example, the grant frame contains a mapping of grants 410a–n that correspond to the specific requests previously sent by the request controller. A "1" means the request is granted, a "0" means the request is not granted. Furthermore, as discussed, at most one request is granted per switch frame by an independent scheduler. Thus there may be at most one high level grant bit per grant frame for unicast switch frames (however, grants to multicast switch frames should have more than one high level grant bit per grant frame).

Next, the switch frame grant is processed. This simply means the granted cell, if any, is pulled from its queue and placed in the next outgoing switch frame. The switch frame grant process is labeled as 605 in FIG. 6. The cell transmission to the switch plane (labeled as 606) occurs by encapsulation within the next outgoing switch frame. That is, as discussed in reference to FIG. 4a, there may be a cell 403 along with the request field 401 per switch frame. A request field and the cell granted from the previous cycle's request is sent to the switch fabric on each clock tick. The switch fabric therefore should respond to each switch frame within enough time to give the ingress port enough time to encapsulate the granted cell before the next clock tick. That is, steps 601 thru 605 of FIG. 6 ideally occur within a single cycle.

Finally, the cell is switched through the switch plane and then transmitted to the egress port or egress ports in the case of a multicast cell. The egress port then processes the cell for outbound transmission. These processes are shown as 607 and 608 in FIG. 6.

Figure 7:
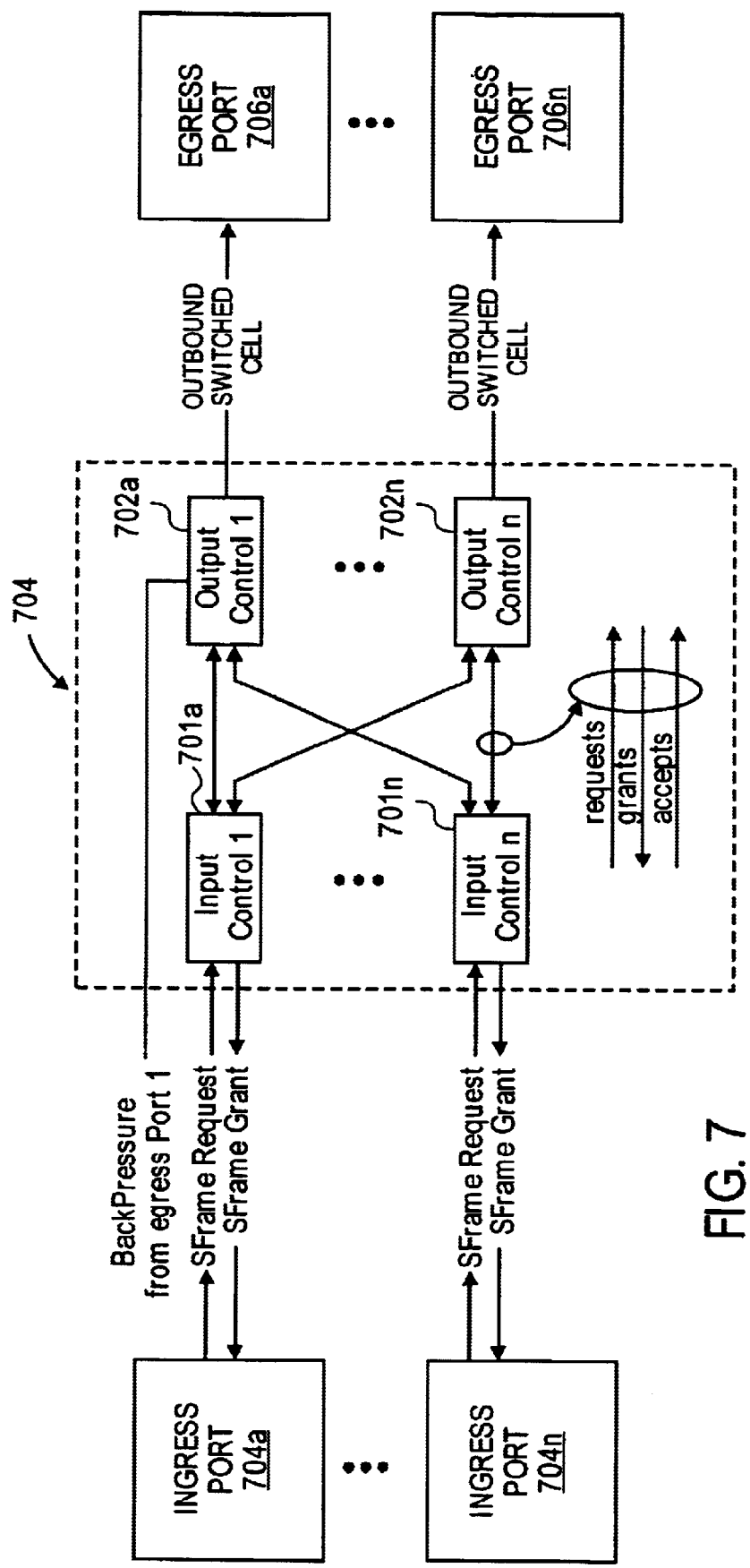
FIG. 7 shows an architecture of a switch plane having independent scheduling.

FIG. 7 shows the architecture of a switch plane with an independent scheduler 709. Switch plane 709 corresponds to a single switch plane (e.g. switch plane 309a of FIG. 3). In the embodiment discussed herein, the scheduling process is integrated into the switch plane 709 itself. Each input control port 701a–n interfaces with a corresponding ingress port 704a–n. The switch plane 709 receives at input control ports 701a–n a switch frame from each of the n ingress ports 704a–n. As discussed, switch frames may contain both service requests for currently queued traffic as well as the actual cell that was granted in the previous clock tick. In the embodiment shown in FIG. 7, the switch plane 709 is a crossbar type switch and is capable of switching n cells per clock tick. Generally, when granted cells arrive at the input control ports 701a–n they are directed to their appropriate output control ports 702a–n. Similar to the ingress side, each output control port 702a–n interfaces with a corresponding egress port 706a–n. Thus, each output control port 702a–n feeds its corresponding egress port 706a–n with switched cells. Each egress port 306a–m (as shown back in FIG. 3) can handle an output control port feed from each switching plane 309a–h in a single clock tick.

Thus the switch plane 709 switches granted cells on each clock tick. Simultaneously, the switch plane processes all the requests that arrived with the switch frames of the granted cells. That process, referred to as the switch plane selection process, is next described.

Figure 8:
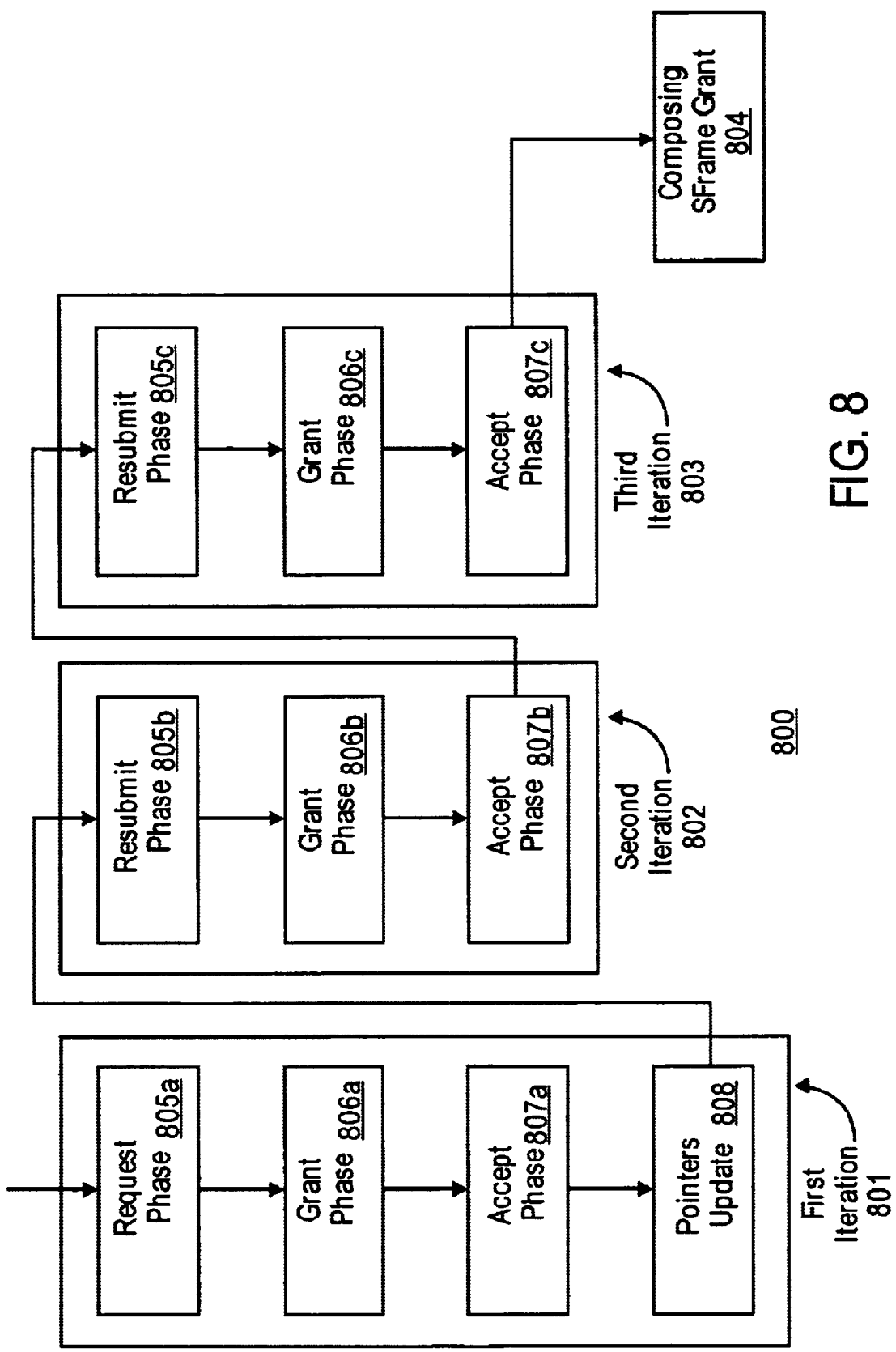
FIG. 8 shows a switch plane selection process.

FIG. 8 shows an embodiment of a switch plane selection process 800 that determines which service requests will be granted. In the first request phase 801 each input control port 701a–n (referring briefly back to FIG. 7) requests to establish connection with the output control ports 702a–n. That is, each input control port 701a–n requests connection for every request received within its incoming switch frame. This means a single input control port (e.g. input control port 701a) may direct connection requests to multiple output control ports 702a–n. Furthermore as FIG. 7 shows, each output control port 702a–n is configured to receive connection requests from every input control port 701a–n. Frequently an output control port 702a–n receives multiple requests. Referring to FIG. 8, the input control ports' request(s) for connection are referred to as a request phase (e.g. request phase 805a of the first iteration 801).

During the first grant phase 806a, each output control port will grant only one connection request among the multiple connection requests (potentially) from the input control ports. Since a single input control port may have made multiple connection requests it is possible that the same input control port may receive multiple grants during the first grant phase 806a. If an input control port receives multiple grants (i.e. a multiple granted input control port) there must be other input control ports that have not received any grants (since each output control port only grants one request). Thus there are instances where input control ports do not receive any grants after the first grant phase 806a (i.e. ungranted input control ports).

During the first accept phase 807a, each multiple granted input control port (if any) will accept only one grant. In such an instance, by accepting only one grant, the remaining output control ports whose grants to the multiple granted input control port were not accepted go unfulfilled. The result is wasted switch plane bandwidth. That is, reception of multiple grants by an input control port results in unfulfilled pairs of input and output control ports where the number of input control ports who received no grants equals the number of output control ports whose grant was not accepted by a multiple granted input control port. These pairs of unfulfilled control ports correspond to an unswitched cell that otherwise could have been switched in the clock tick.

In order to fill remaining pairs of unfilled control ports, the request/grant/accept process should be repeated (i.e., iterated). That is, after the first iteration 801 (phases 805a–807a) a second iteration 802 (phases 805b–807b) of similar steps is undertaken where the filled input/output control port pairs do not participate in the second iteration.

Thus only those input control ports that did not receive a grant in the first iteration resend their connection request(s) to the same output control ports as the first request phase 805a, except for those output control ports who have granted a request to another input control port and have had that grant accepted by the control port. For clarity, the first phase of the second iteration 802 is referred to as a resubmit phase 805b. Only input control ports without a grant participate in the resubmit phase 805b. After the second iteration is complete, a third iteration 803 (phases 805c–807c) is performed.

Figures 9, 9A, 9B:
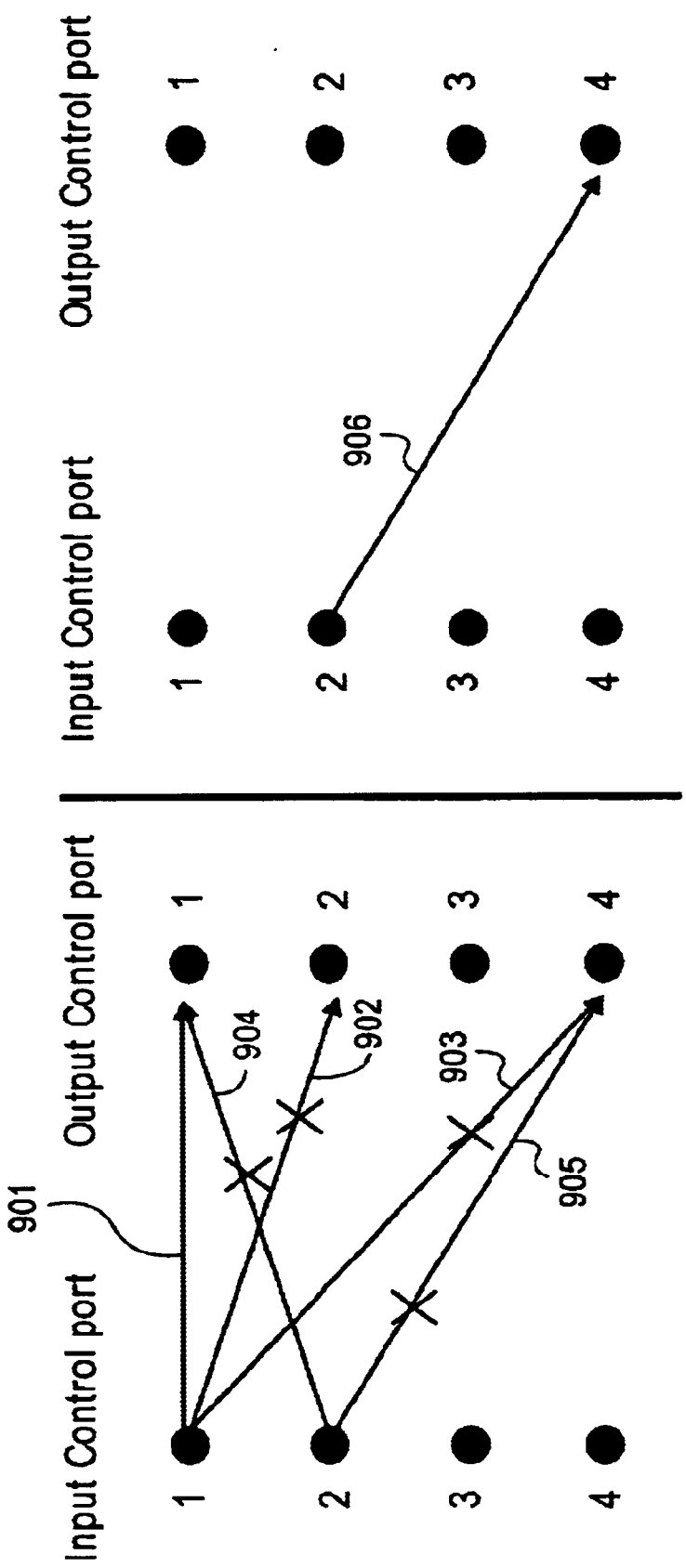
FIG. 9a shows a first iteration of a switch plane selection process.
FIG. 9b shows a second iteration of a switch plane selection process.

FIGS. 9a and 9b show an example of the switch plane selection process. FIG. 9a shows the first iteration. During the request phase, input control port 1 submits connection requests 901, 902, 903 to output control ports 1, 2 and 4 while input control port 2 submits connection requests to output control ports 1 and 4. During the grant phase output control ports 1, 2 and 4 grant each of the requests from output control 1. Thus input control port 2 receives no grants and his requests 904, 905 go unfulfilled. This is represented by cross-outs on requests 904, 905 in FIG. 9a. During the accept phase, input control port 1 accepts the grant from output control port 1 as an input control port may only accept one grant. This results in the grants given by output control ports 2 and 4 (to requests 902, 903) going unfulfilled as represented by the cross-outs in FIG. 9a. Thus at the end of the first iteration, input control port 1 and output control port 1 are a matched pair that will not participate in the next iteration.

FIG. 9b shows the second iteration. During the resubmit phase, input control port 1 resends his original requests except for the request sent to output control port 1. This leaves only one request 906 which is resent to output control port 4. As no other competing connection requests exist, output control port 4 will grant this request.

In the embodiments discussed herein, only three iterations are performed. However, other embodiments may exist with more iterations. As the number of iterations increases, the theoretical throughput approaches 100%.

In some instances, however, 100% throughput is not possible. For example, consider the case where only two input control ports have traffic to switch (i.e., all other input control ports are empty). Furthermore, assume that the traffic of both input controls are destined for the same output control port. In such an instance the output control port may only grant access to one input control port at the expense of the other. The non-serviced input control port can only wait until the next clock tick.

The presence of different switch frame types (e.g., unicast or multicast) complicates the switch plane selection process. As discussed, a single multicast switch frame maps service requests according to all the egress ports needed to realize the multicast connection of a mutlicast cell. In order to preserve (as best as possible) the quality of service of the multicast connection, it is desirable to switch all the multicast cells at once. Thus when satisfying a multicast connection request, all the output controls ports implicated in the mutlicast connection should concentrate their grants to the input control port requesting service for the cell mutlicast. Furthermore, for multicast requests, a single input control port should accept all the grants rather than limit acceptance to only one as in the aforementioned unicast case.

The various priority levels of each request even further complicate the switching process. Higher priority requests are granted by the output control ports before lower priority requests. FIG. 10a shows the translation 1001 of switch frame service request to priority level. The priority level, from highest to lowest, is: first) High Priority, second) Cell Available, third) Low Priority.

For fairness the scheduler maintains a number of pointers (not shown). The pointers help determine: 1) whether a multicast request is to be preferred or not (the Multicast/Unicast Grant Preference Pointer); 2) which multicast request to select if more than one exists (the Multicast Grant Round Robin Pointer); and 3) which unicast request to select if more than one exists (the Unicast Grant Round Robin Pointer).

The Multicast/Unicast Grant Preference Pointer determines whether to use a grant preference ranking scheme that prefers multicast traffic or, in the alternative, unicast traffic. In this embodiment, there is one such pointer per switch plane. Thus all n output control ports 702a–n on a single switch plane 709 (referring briefly back to FIG. 7) are in the same mode as to preferring multicast or unicast traffic as they are all guided by the setting of a single pointer. FIG. 10b shows the preference ranking scheme for an output control port in multicast preferred mode 1002 as well as unicast preferred mode 1003. The output control port will always select the grant that is categorized highest on the preference ranking scheme. The pointer setting is quasi-permanent. That is, it typically is adjusted only by the network management operator or under other special conditions. Such special conditions may employ the use of intelligent and/or automatic traffic flow monitoring performed in system hardware or software. Such monitors may perform the adjustment itself. In other embodiments, the switch plane may operate indefinitely in the mode selected by the pointer and its corresponding preference ranking scheme.

The Multicast Grant Round Robin Pointer and the Unicast Grant Round Robin Pointers are used to guarantee 100% fairness to all ingress ports. That is, whereas the Mutlicast/Unicast Grant Reference Pointer determines contention between multicast and unicast cells, the round robin pointers determine contention among ingress ports. The preference ranking scheme consists of a list of n numbers listed sequentially. The pointer rolls the preference ranking scheme one unit each time the preference ranking is used. If the output control port has to choose between two requests from two or more different ingress queues it will select the ingress port listed highest in the preference ranking scheme. After the selection is made, the preference ranking is shifted one unit. Thus the ranking continually wraps around which, over time, guarantees 100% fairness to all ingress ports. In one embodiment there is one multicast Grant Round Robin Pointer per switch plane and one Unicast Grant Round Robin Pointer per output control port. Also, the input control port, if it receives more than grant may also use the reference and round robin pointers to resolve multiple grant contention after it first determines which grants are highest priority according to the currently active preference ranking scheme (as discussed in regards to FIG. 10).

For one embodiment, referring back to FIG. 8, only high priority connection requests are considered during the first iteration 801. In another embodiment, only high priority and cell available connection requests are considered during the first iteration 801. These embodiments may add further assurance that higher priority connection requests are granted before lower priority connection requests.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An apparatus, comprising:
   a) a plurality of ingress ports;
   b) a plurality of switch planes, each of said switch planes designed to schedule its own traffic, each of said switch planes having a plurality of input control ports communicatively coupled to a plurality of output control ports in a crossbar arrangement, each of said input control ports of a particular switch plane being coupled to a different one of said ingress ports, said crossbar arrangement to:
   transport switching requests from its switch plane's input control ports to
   its switch plane's output control ports.

2. The apparatus of claim 1 wherein each of said ingress ports have at least one unicast queue.

3. The apparatus of claim 2 wherein said ingress ports further comprises a plurality of unicast queues, each of said unicast queues dedicated to a specific egress port.

4. The apparatus of claim 1 wherein each of said ingress ports have a multicast queue.

5. The apparatus of claim 1 wherein each of said switch planes further comprises a pointer to determine priority between multicast and unicast portions of its said own traffic.

6. The apparatus of claim 1 wherein each of said switch planes further comprises a pointer to determine priority between those of its input control ports having multicast traffic that are contending.

7. The apparatus of claim 1 wherein each of said switch planes further comprises a pointer for each of its output control ports to determine priority between those of its input control ports having unicast traffic that are contending.

8. The apparatus of claim 1 further comprising one or more adapter cards communicatively coupled to at least one of said ingress ports.

9. An apparatus, comprising:
   a) an ingress port having a request controller, said request controller coupled to a unicast queue and a multicast queue, said request controller having a mapping unit configured to map, into frames, service requests for unicast traffic queued in said unicast queue and service requests for multicast traffic queued in said multicast queues; and,
   b) a plurality of switch planes, each of said switch planes capable of scheduling its own traffic, each of said switch planes communicatively coupled to said request controller so that any one of said requests reaches at least one of said switch planes.

10. The apparatus of claim 9 wherein said frames further comprises a unicast frame for requesting service for traffic queued in said unicast queue.

11. The apparatus of claim 10 wherein said unicast frame further comprises a request type for indicating unicast traffic requests are within said unicast frame.

12. The apparatus of claim 10 wherein said ingress port further comprise a plurality of unicast queues, where, a service request is capable of being provided for each of said unicast queues via said frames.

13. The apparatus of claim 12 wherein each of said service requests for traffic queued in said unicast queues indicate, within their corresponding frame, a request for primary or secondary service and a request for speedup or no speedup.

14. The apparatus of claim 9 wherein said frames further comprises a multicast frame for requesting service for traffic queued in said multicast queue.

15. The apparatus of claim 14 wherein said multicast frame further comprises a request type for indicating that multicast traffic requests are within said multicast frame.

16. The apparatus of claim 15 further comprising a plurality of egress ports coupled to each of said plurality of switch planes, each of said service requests identifying a particular one of each of said egress ports within its corresponding frame.

17. The apparatus of claim 16 wherein each of said service requests for traffic queued in said multicast queue indicate a request for speedup or no speedup.

18. The apparatus of claim 9 wherein said frames further comprises traffic whose previous request for service was granted.

19. The apparatus of claim 18 wherein said traffic is ATM traffic.

20. A method, comprising:
   queuing traffic at an ingress port;
   assigning a higher priority to queued multicast traffic than to non head of line queued unicast traffic in order to resolve contention between multicast and unicast portions of said traffic;
   requesting switch plane service for said traffic across a plurality of switch planes; and,
   scheduling said traffic independently at each of said switch planes.

21. The method of claim 20 wherein said queuing traffic further comprises queuing unicast traffic into a unicast queue.

22. The method of claim 21 further comprising queuing unicast traffic into a plurality of unicast queues.

23. The method of claim 22 wherein each of said plurality of unicast queues correspond to a different egress port.

24. The method of claim 20 wherein said requesting switch plane service across a plurality of switch planes further comprises spreading service requests for said traffic in a round robin fashion across said plurality of switch planes.

25. The method of claim 20 wherein said requesting switch plane service across a plurality of switch planes further comprises spreading service requests for said traffic in a round robin fashion across said plurality of switch planes, each of said service requests indicating either a request for primary service or a request for secondary service.

26. The method of claim 20 wherein said requesting switch plane service across a plurality of switch planes further comprises mapping service requests for queued cells into frames.

27. The method of claim 26 wherein said mapping service requests for queued cells into frames further comprises independently mapping, for each of a plurality of unicast queues, said service requests into said frames, wherein, a different one of said frames is generated for each one of said switch planes.

28. The method of claim 27 wherein said independently mapping further comprises mapping service requests, for cells that are queued within a same unicast queue, in a round robin fashion across said frames, said round robin fashion organized according to $$1 + \text{remainder}\left[\frac{(\text{ingress port number}) + (\text{offset}) + (\text{position in queue})}{(\text{number of switch planes})}\right]$$

where the position in queue is 0,1,2,3, . . . ((number of cells in queue)−1)$|_{max-((number\ of\ switch\ planes)-1)}$ and said offset corresponds to the last said switch plane that received a request from said independently requesting unicast queue.

29. The method of claim 26 further comprising mapping a head of line unicast queued cell as a primary request and mapping a non head of line unicast queued cell as a secondary requests.

30. The method of claim 26 further comprising entering a speedup mode wherein all queued cells within a particular unicast queue are mapped as primary requests.

31. The method of claim 26 wherein said queuing traffic further comprises queuing multicast traffic into a multicast queue.

32. The method of claim 31 further comprising generating one of said frames per queued multicast cell.

33. The method of claim 31 wherein multicast cells are mapped only as a primary requests.

34. The method of claim 26 wherein multicast traffic is queued into a multicast queue and unicast traffic is queued into a plurality of unicast queues, each of said plurality of unicast queues corresponding to a different egress port.

35. The method of claim 34 wherein head of line unicast cells are mapped as primary requests, non head of line unicast cells are mapped as secondary requests and all multicast cells are mapped as a primary requests.

36. The method of claim 26 wherein said frames further comprise plurality of request fields, each of said request fields corresponding to a different egress port.

37. The method of claim 20 wherein said requesting switch plane service for said traffic across a plurality of switch planes further comprises including traffic whose prior request was granted.

38. The method of claim 20 wherein said traffic is ATM traffic.

39. The method of claim 38 wherein said ATM traffic comprises ATM cells.

40. The method of claim 20 wherein said requesting switch plane service across a plurality of switch planes further comprises mapping service requests for queued cells into frames and wherein said frames further comprise multicast frames and unicast frames.

41. A method, comprising:
receiving service requests at a plurality of switch planes;
independently executing a scheduling method at each of said switch planes, each of said scheduling methods comprising:
request phase wherein a plurality of switch plane input control ports request a plurality of switch plane output control ports for connection,
a grant phase wherein said plurality of switch plane output control ports at least partially grant said requests,
an accept phase wherein those of said plurality of switch plane input control ports having received at least one grant accepts a said grant.

42. The method of claim 41 wherein each of said switch plane input control ports are communicatively coupled to each of a plurality of ingress ports such that each of said ingress ports send a portion of said service requests to a said input control port.

43. The method of claim 41 wherein said request phase further comprises translating said service requests to a connection request prior to said request for connection, said sending service requests also having egress port information, each of said connection requests sent to the appropriate said egress port for each of said service requests.

44. The method of claim 43 wherein said connection requests further comprise high priority connection requests, cell available connection requests and low priority connection requests, said grant phase further comprising independent execution for each of said switch plane output control ports, each of said independent executions granting said high priority connection requests before said cell available connection requests and granting said cell available connection requests before said low priority connection requests.

45. The method of claim 44 wherein said translating further comprises translating a primary with speedup request to a high priority connection request.

46. The method of claim 44 wherein said translating further comprises translating a primary without speedup service request to a cell available connection request.

47. The method of claim 44 wherein said translating further comprises translating a secondary request to a low priority connection request.

48. The method of claim 41 wherein said grant phase further comprises independent execution at each of said switch plane output control ports.

49. The method of claim 48 wherein said grant phase further comprises each of said output control ports only issuing one said grant per cycle.

50. The method of claim 48 wherein said grant phase further comprises referring to a pointer to determine whether a switch plane output control port shall grant a unicast connection request or a multicast connection request.

51. The method of claim 48 wherein said grant phase further comprises referring to a pointer to determine which of a plurality of multicast connection requests a said switch plane output control port shall grant.

52. The method of claim 48 wherein said grant phase further comprises referring to a pointer to determine which of a plurality of unicast connection requests a said switch plane output control port shall grant.

53. The method of claim 41 wherein said accept phase further comprises each of said input control ports issuing only one said grant per cycle.

54. The method of claim 53 wherein said accept phase further comprises referring to a pointer to determine whether a said switch plane input control port shall accept a granted unicast connection request or a granted multicast connection request.

55. The method of claim 53 wherein said accept phase further comprises referring to a pointer to determine which of a plurality of granted multicast connection requests a said switch plane input control port shall accept.

56. The method of claim 53 wherein said accept phase further comprises referring to a pointer to determine which granted unicast connection request a said switch plane input control port shall accept.

57. The method of claim 41 wherein said scheduling method further comprises a second request phase, a second grant phase and a second accept phase such that only those of said switch plane input control ports having not received any said grant phase grants participate and only those switch plane output control ports having not received any said accept phase acceptances participate.

58. The method of claim 57 wherein said scheduling method further comprises a third request phase, a third grant phase and a third accept phase such that only those of said switch plane input control ports having not received any said second grant phase grants participate and only those switch plane output control ports having not received any said second accept phase acceptances participate.

59. An apparatus, comprising:
   a) means for queuing traffic at an ingress port;
   b) means for resolving contention for service between multicast and unicast portions of said traffic;
   c) means for requesting switch plane service for said traffic across a plurality of switch planes; and,
   d) means for scheduling said traffic independently at each of said switch planes.

60. The apparatus of claim 59 wherein said means for queuing traffic further comprises means for queuing unicast traffic into a unicast queue.

61. The apparatus of claim 60 wherein said means for queuing unicast traffic further comprises means for queueing unicast traffic into a plurality of unicast queues.

62. The apparatus of claim 61 wherein each of said plurality of unicast queues correspond to an a different egress port.

63. The apparatus of claim 59 wherein said means for requesting switch plane service across a plurality of switch planes further comprises means for spreading service requests for said traffic in a round robin fashion across said plurality of switch planes.

64. The apparatus of claim 59 wherein said means for requesting switch plane service across a plurality of switch planes further comprises means for spreading service requests for said traffic in a round robin fashion across said plurality of switch planes, each of said service requests indicating either a request for primary service or a request for secondary service.

65. The apparatus of claim 59 wherein said means for requesting switch plane service across a plurality of switch planes further comprises means for mapping service requests for queued cells into frames.

66. The apparatus of claim 65 wherein said means for mapping service requests for queued cells into frames further comprises means for independently mapping, for each of a plurality of unicast queues, said service requests into said frames, wherein, a different one of said frames is generated for each one of said switch planes.

67. The apparatus of claim 66 wherein said means for independently mapping further comprises means for mapping service requests, for cells that are queued within a same unicast queue, in a round robin fashion across said frames, said round robin fashion organized according to $$1 + \text{remainder}\left[\frac{\text{(ingress port number)} + \text{(offset)} + \text{(position in queue)}}{\text{(number of switch planes)}}\right]$$

where the position in queue is 0,1,2,3, . . . ((number of cells in queue)−1)$|_{max=((number\ of\ switch\ planes)-1)}$ and said offset corresponds to the last said switch plane that received a request from said independently requesting unicast queue.

68. The apparatus of claim 65 further comprising means for mapping a head of line unicast queued cell as a primary request and means for mapping a non head of line unicast queued cell as a secondary requests.

69. The apparatus of claim 65 further comprising means for entering a speedup mode wherein all queued cells within a particular unicast queue are mapped as primary requests.

70. The apparatus of claim 65 wherein said means for queuing traffic further comprises means for queuing multicast traffic into a multicast queue.

71. The apparatus of claim 70 further comprising means for generating one of said frames per queued multicast cell.

72. The apparatus of claim 74 wherein multicast cells are mapped only as a primary requests.

73. The apparatus of claim 65 further comprising means for queueing unicast traffic and means for queueing multicast traffic queue, wherein, unicast traffic is queued into a plurality of unicast queues, each of said plurality of unicast queues corresponding to an egress queue.

74. The apparatus of claim 73 wherein head of line unicast cells are mapped as primary requests, non head of line unicast cells are mapped as secondary requests and the head of line multicast cell is mapped as a primary request.

75. The apparatus of claim 65 wherein said frames further comprise a plurality of request fields, each of said request fields corresponding to a different egress port.

76. The apparatus of claim 59 wherein said means for requesting switch plane service for said traffic across a plurality of switch planes further comprises means for including traffic whose prior request was granted.

77. The apparatus of claim 59 wherein said traffic is ATM traffic.

78. The apparatus of claim 74 wherein said ATM traffic further comprises ATM cells.

79. The apparatus of claim 59 wherein said requesting switch plane service across a plurality of switch planes further comprises means for mapping service requests for queued cells into frames and wherein said frames further comprise multicast frames and unicast frames.

80. An apparatus, comprising:
   a) a plurality of ingress ports; and
   b) a plurality of ATM switch planes, each of said ATM switch planes, designed to schedule its own traffic, each of said ATM switch planes having a plurality of input control ports communicatively coupled to a plurality of output control ports in a crossbar arrangement, each of said input control ports of a particular switch plane being coupled to a different one of said ingress ports, said crossbar arrangement to:
      transport switching requests from its switch plane's input control ports to
      its switch plane's output control ports.

81. The apparatus of claim 80 wherein said communicative coupling further comprises one of said input control ports coupled to said ingress port.

82. The apparatus of claim 80 wherein said ingress port has at least one unicast queue.

83. The apparatus of claim 82 wherein said ingress port further comprises a plurality of unicast queues, each of said unicast queues dedicated to a specific egress port.

84. The apparatus of claim 80 wherein said ingress port has a multicast queue.

85. The apparatus of claim 80 wherein said dedicated scheduler further comprises a pointer to determine priority between multicast and unicast traffic.

86. The apparatus of claim 80 wherein said dedicated scheduler further comprises a pointer to determine priority between contending said input control ports having multicast traffic.

87. The apparatus of claim 80 wherein said dedicated scheduler further comprises a pointer for each of said output control ports to determine priority between contending said input control ports having unicast traffic.

88. An apparatus, comprising:
a) a plurality of ingress ports; and
b) a plurality of switch planes, each of said switch planes having a dedicated scheduler that is dedicated to scheduling its corresponding switch plane's traffic, said dedicated scheduler for each of said switch planes further comprising a plurality of input control ports coupled to a plurality of output control ports to support a flow of requests for switching service from said dedicated scheduler's input control ports to said dedicated scheduler's output control ports, said requests sent from said Plurality of ingress ports and received by said dedicated scheduler's input control ports, each of said input control ports coupled to a different one of said ingress ports.

89. The apparatus of claim 88 wherein each of said ingress ports have at least one unicast queue.

90. The apparatus of claim 89 wherein each of said ingress ports further comprises a plurality of unicast queues, each of said unicast queues dedicated to a specific egress port.

91. The apparatus of claim 88 wherein each of said ingress ports have a multicast queue.

92. The apparatus of claim 88 wherein each of said switch planes further comprises a pointer to determine priority between multicast and unicast traffic.

93. The apparatus of claim 88 wherein each of said switch planes further comprises a pointer to determine priority between contending said input control ports having multicast traffic.

94. The apparatus of claim 88 wherein each of said switch planes further comprises a pointer for each of said output control ports to determine priority between contending said input control ports having unicast traffic.

95. An apparatus, comprising:
a) an ingress port having a request controller, said request controller coupled to a unicast queue and a multicast queue, said request controller having a mapping unit comprising logic gates configured to map service requests for traffic queued in said unicast and multicast queues; and,
b) a plurality of switch planes, each of said switch planes having a dedicated scheduler, each of said switch planes communicatively coupled to said request controller in order to receive said requests.

96. The apparatus of claim 95 wherein said logic gates are further configured to map said service requests into a frame.

97. The apparatus of claim 96 wherein said frame further comprises a unicast frame for requesting service for traffic queued in said unicast queue.

98. The apparatus of claim 97 wherein said unicast frame further comprises a request type for indicating unicast traffic requests are within said unicast frame.

99. The apparatus of claim 97 wherein said ingress port further comprises a plurality of unicast queues, where, a service request is provided for each of said unicast queues.

100. The apparatus of claim 99 wherein each of said service requests for traffic queued in said unicast queues indicate a request for primary or secondary service and a request for speedup or no speedup.

101. The apparatus of claim 96 wherein said frame further comprises a multicast frame for requesting service for traffic queued in said multicast queue.

102. The apparatus of claim 101 wherein said frame further comprises a request type for indicating multicast traffic requests are within said multicast frame.

103. The apparatus of claim 102 further comprising a plurality of egress ports coupled to each of said plurality of switch planes, each of said service requests corresponding to one of each of said egress ports.

104. The apparatus of claim 103 wherein each of said service requests for traffic queued in said multicast queue indicate a request for speedup or no speedup.

105. The apparatus of claim 96 wherein said frame further comprises traffic whose previous request for service was granted.

106. An apparatus, comprising:
a) an ingress port having a request controller, said request controller coupled to a unicast queue and a multicast queue, said request controller having a mapping unit comprising logic gates configured to map service requests for cells queued in said unicast and multicast queues; and,
b) a plurality of ATM switch planes, each of said ATM switch planes having a dedicated scheduler, each of said ATM switch planes communicatively coupled to said request controller in order to receive said requests.

107. The apparatus of claim 106 wherein said logic gates are further configured to map said service requests into a frame.

108. The apparatus of claim 107 wherein said frame further comprises a unicast frame for requesting service for cells that are queued in said unicast queue.

109. The apparatus of claim 108 wherein said unicast frame further comprises a request type for indicating unicast cell requests are within said unicast frame.

110. The apparatus of claim 108 wherein said ingress port further comprises a plurality of unicast queues, where, a service request is provided for each of said unicast queues.

111. The apparatus of claim 110 wherein each of said service requests for cells that are queued in said unicast queues indicate a request for primary or secondary service and a request for speedup or no speedup.

112. The apparatus of claim 107 wherein said frame further comprises a multicast frame for requesting service for cells queued in said multicast queue.

113. The apparatus of claim 112 wherein said frame further comprises a request type for indicating multicast cell requests are within said multicast frame.

114. The apparatus of claim 113 further comprising a plurality of egress ports coupled to each of said plurality of switch planes, each of said service requests corresponding to one of each of said egress ports.

115. The apparatus of claim 114 wherein each of said service requests for cells queued in said multicast queue indicate a request for speedup or no speedup.

116. The apparatus of claim 115 wherein said frame further comprises a cell whose previous request for service was granted.

117. The apparatus of claim 106 wherein said cells are ATM cells.

118. A method, comprising:
queuing cells at an ingress port, said cells including both multicast cells and unicast cells;
resolving conflict for service between said multicast cells and said unicast cells;
requesting switch plane service for said cells across a plurality of switch planes; and,
scheduling said cells independently at each of said switch planes.

119. The method of claim 118 wherein said queuing cells further comprises queuing unicast cells into a unicast queue.

120. The method of claim 119 further comprising queuing said unicast cells into a plurality of unicast queues.

121. The method of claim 120 wherein each of said plurality of unicast queues correspond to an egress port.

122. The method of claim 118 wherein said requesting switch plane service across a plurality of switch planes further comprises spreading service requests for said cells in a round robin fashion across said plurality of switch planes.

123. The method of claim 118 wherein said requesting switch plane service across a plurality of switch planes further comprises spreading service requests for said cells in a round robin fashion across said plurality of switch planes, each of said service requests indicating either a request for primary service or a request for secondary service.

124. The method of claim 118 wherein said cells are ATM cells.

125. The method of claim 124 wherein said requesting switch plane service across a plurality of switch planes further comprises mapping service requests for said queued ATM cells into frames.

126. The method of claim 124 wherein said mapping service requests for said queued ATM cells into frames further comprises independently mapping, for each of a plurality of unicast queues, said service requests into said frames, wherein, a different one of said frames is generated for each one of said switch planes.

127. The method of claim 126 wherein said independently mapping further comprises mapping service requests, for ATM cells that are queued within a same unicast queue, in a round robin fashion across said frames, said round robin fashion organized according to $$1 + \text{remainder}\left[\frac{(\text{ingress port number}) + (\text{offset}) + (\text{position in queue})}{(\text{number of switch planes})}\right]$$

where the position in queue is 0,1,2,3, . . . ((number of cells in queue)−1)| max=((number of switch planes)−1)

and said offset corresponds to the last said switch plane that received a request from said independently requesting unicast queue.

128. The method of claim 124 further comprising mapping a head of line unicast queued ATM cell as a primary request and mapping a non head of line unicast queued cell as a secondary requests.

129. The method of claim 124 further comprising entering a speedup mode wherein all queued ATM cells within a particular unicast queue are mapped as primary requests.

130. The method of claim 124 wherein said queuing ATM cells further comprises queuing multicast ATM cells into a multicast queue.

131. The method of claim 130 further comprising generating one of said frames per queued multicast ATM cell.

132. The method of claim 130 wherein multicast ATM cells are mapped only as a primary requests.

133. The method of claim 124 wherein multicast ATM cells are queued into a multicast queue and unicast ATM cells are queued into a plurality of unicast queues, each of said plurality of unicast queues corresponding to an egress queue.

134. The method of claim 133 wherein head of line unicast ATM cells are mapped as primary requests, non head of line unicast ATM cells are mapped as secondary requests and the head of line multicast ATM cell is mapped as a primary request.

135. The method of claim 124 wherein said frames further comprise plurality of request fields, each of said request fields corresponding to an egress port.

136. The method of claim 118 wherein said requesting switch plane service for said traffic across a plurality of switch planes further comprises including a cell whose prior request was granted.

137. The method of claim 118 wherein said requesting switch plane service across a plurality of switch planes further comprises mapping service requests for queued cells into frames and wherein said frames further comprise multicast frames and unicast frames.

138. The method of claim 137 wherein said cells are ATM cells.

* * * * *